(12) United States Patent
Kim et al.

(10) Patent No.: US 10,656,462 B2
(45) Date of Patent: May 19, 2020

(54) LIQUID CRYSTAL DISPLAY

(71) Applicant: SAMSUNG ELECTRONICS CO., LTD., Suwon-si, Gyeonggi-do (KR)

(72) Inventors: Beom Seok Kim, Seoul (KR); Hyunseok Choi, Anyang-si (KR); Ju Hyun Kim, Anyang-si (KR); Masashi Tsuji, Hwaseong-si (KR); Sangah Gam, Seoul (KR); Joungeun Yoo, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 119 days.

(21) Appl. No.: 15/712,708

(22) Filed: Sep. 22, 2017

(65) Prior Publication Data

US 2018/0088369 A1  Mar. 29, 2018

(30) Foreign Application Priority Data

Sep. 23, 2016  (KR) .................. 10-2016-0122498
Sep. 20, 2017  (KR) .................. 10-2017-0121375

(51) Int. Cl.
*G02F 1/13357* (2006.01)
*G02F 1/13363* (2006.01)
(Continued)

(52) U.S. Cl.
CPC .......... *G02F 1/1336* (2013.01); *G02F 1/1343* (2013.01); *G02F 1/133509* (2013.01);
(Continued)

(58) Field of Classification Search
CPC ............ G02F 1/1336; G02F 1/133634; G02F 1/133617; G02F 1/133528;
(Continued)

(56) References Cited

U.S. PATENT DOCUMENTS 5,750,641 A  5/1998  Ezzell et al.
7,630,038 B2  12/2009  Takeda et al.
(Continued)

FOREIGN PATENT DOCUMENTS

JP  3838522 B2  10/2006
JP  3987569 B1  10/2007
(Continued)

OTHER PUBLICATIONS

Extended European Search Report dated Feb. 22, 2018, of the corresponding Europen Patent Application No. 17192715.5.

*Primary Examiner* — Nathanael R Briggs
*Assistant Examiner* — William D Peterson
(74) *Attorney, Agent, or Firm* — Cantor Colburn LLP

(57) ABSTRACT

A liquid crystal display includes a light source and a liquid crystal panel, wherein the liquid crystal panel includes a first substrate on the light source, a second substrate facing the first substrate, a liquid crystal layer between the first substrate and the second substrate, a color conversion layer between the second substrate and the liquid crystal layer, and including a light emitting element configured to receive a first visible light from the light source and emit a second visible light, a first polarizing layer between the liquid crystal layer and the color conversion layer, and a first phase difference layer between the liquid crystal layer and the first polarizing layer.

33 Claims, 8 Drawing Sheets
(7 of 8 Drawing Sheet(s) Filed in Color)

(51) Int. Cl.
*G02F 1/1335* (2006.01)
*G02F 1/1343* (2006.01)

(52) U.S. Cl.
CPC .. *G02F 1/133514* (2013.01); *G02F 1/133528* (2013.01); *G02F 1/133617* (2013.01); *G02F 1/133634* (2013.01); *G02F 2001/133548* (2013.01); *G02F 2001/133565* (2013.01)

(58) Field of Classification Search
CPC ......... G02F 1/133514; G02F 1/133509; G02F 1/1343; G02F 1/13363; G02F 2001/133548; G02F 2001/133565
USPC .......................................................... 349/61
See application file for complete search history.

(56) References Cited

U.S. PATENT DOCUMENTS

| | | | |
|---|---|---|---|
| 7,826,017 B2 | 11/2010 | Uesaka | |
| 7,852,436 B2 | 12/2010 | Shimizu et al. | |
| 7,944,531 B2 | 5/2011 | Takeda et al. | |
| 8,796,704 B2 | 8/2014 | Hatta et al. | |
| 2005/0099562 A1 | 5/2005 | Nishikouji et al. | |
| 2007/0200986 A1* | 8/2007 | Ong | G02F 1/13363 349/117 |
| 2008/0113115 A1 | 5/2008 | Ishizaki et al. | |
| 2010/0079704 A1* | 4/2010 | Cho | G02F 1/133617 349/71 |
| 2010/0134737 A1* | 6/2010 | Kawamoto | G02B 5/3083 349/119 |
| 2010/0201909 A1* | 8/2010 | Jung | G02F 1/133528 349/61 |
| 2015/0109560 A1 | 4/2015 | Guo et al. | |
| 2015/0331278 A1 | 11/2015 | Araki et al. | |

FOREIGN PATENT DOCUMENTS

| | | |
|---|---|---|
| JP | 2011075817 A | 4/2011 |
| JP | 2013104888 A | 5/2013 |
| KR | 101065181 B1 | 9/2011 |
| KR | 101450687 B1 | 10/2014 |

* cited by examiner

LIQUID CRYSTAL DISPLAY

CROSS-REFERENCE TO RELATED APPLICATION

This application claims priority to and the benefit of Korean Patent Application No. 10-2016-0122498, filed on Sep. 23, 2016 and Korean Patent Application No. 10-2017-0121375, filed on Sep. 20, 2017, and all the benefits accruing therefrom under 35 U.S.C. § 119, the contents of which in their entirety are incorporated herein by reference.

BACKGROUND

1. Field

A liquid crystal display (LCD) is disclosed.

2. Description of the Related Art

A liquid crystal display (LCD) is a flat panel display that is widely used. The LCD includes two display panels including field generating electrodes and a liquid crystal layer interposed therebetween, and the liquid crystals in the liquid crystal layer rotate in response to an electric field formed between the field generating electrodes to thereby vary light transmittance and display an image.

The LCD displays color by combining light from a light source with a color filter. However, the color filter may absorb a large amount of light emitted from the light source and lower photoefficiency. It is therefore desirable to provide an LCD with improved photoefficiency.

SUMMARY

Research regarding a photoluminescent liquid crystal display (LCD) displaying a color by using a light emitting element, instead of a color filter, has been conducted.

However, the photoluminescent LCD may not have a structure which includes a polarizing plate and a phase difference film disposed on the light emitting element, due to light-scattering characteristics of the light emitting element. Accordingly, the photoluminescent LCD may demonstrate a deteriorated contrast ratio and deteriorated display characteristics as compared with a liquid crystal display using a color filter.

An embodiment provides a liquid crystal display capable of increasing a contrast ratio of a photoluminescent LCD and thus improving display characteristics.

According to one embodiment, a liquid crystal display (LCD) includes a light source and a liquid crystal panel, wherein the liquid crystal panel includes a first substrate disposed on the light source, a second substrate facing the first substrate, a liquid crystal layer between the first substrate and the second substrate, a color conversion layer between the second substrate and the liquid crystal layer, and including a light emitting element configured to receive a first visible light from the light source and emit a second visible light, a first polarizing layer between the liquid crystal layer and the color conversion layer, and a first phase difference layer between the liquid crystal layer and the first polarizing layer.

The first phase difference layer may include a heat resistant polymer, a heat resistant liquid crystal, or a combination thereof.

The heat resistant polymer and the heat resistant liquid crystal may each have a glass transition temperature of greater than or equal to about 150° C.

The liquid crystal display may further include a second polarizing layer between the light source and the first substrate.

The liquid crystal display may further include a second phase difference layer between the light source and the first substrate.

The first phase difference layer may have a refractive index satisfying Relationship Equation 1.

$n_{x1} \leq n_{y1} \geq n_{z1}$     Relationship Equation 1

In Relationship Equation 1, $n_{x1}$ is a refractive index at a slow axis of the first phase difference layer, $n_{y1}$ is a refractive index at a fast axis of the first phase difference layer, and $n_{z1}$ is a refractive index in a direction perpendicular to the slow axis and the fast axis of the first phase difference layer.

The first phase difference layer may have retardation satisfying Relationship Equation 2.

$40\ nm \leq R_{th1}(450\ nm) \leq 310\ nm$     Relationship Equation 2

In Relationship Equation 2, $R_{th1}$ (450 nm) is a thickness direction retardation of the first phase difference layer at a 450 nm wavelength.

The liquid crystal display may further include a second phase difference layer between the light source and the first substrate, and the second phase difference layer may have a refractive index satisfying Relationship Equations 3 and 4.

$n_{x2} > n_{y2}$     Relationship Equation 3

$n_{x2} > n_{z2}$     Relationship Equation 4

In Relationship Equations 3 and 4, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

The second phase difference layer may have a refractive index satisfying Relationship Equation 5-1.

$n_{x2} > n_{y2} = n_{z2}$     Relationship Equation 5-1

In Relationship Equation 5-1, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

The second phase difference layer may have retardation satisfying Relationship Equation 6-1.

$70\ nm \leq R_{in2}(450\ nm) \leq 170\ nm$     Relationship Equation 6-1

In Relationship Equation 6-1, $R_{in2}$ (450 nm) is in-plane retardation of the second phase difference layer at a 450 nm wavelength.

The first phase difference layer may have retardation of Relationship Equation 2-1.

$130\ nm \leq R_{th1}(450\ nm) \leq 310\ nm$     Relationship Equation 2-1

Wherein, in Relationship Equation 2-1, $R_{th1}$ (450 nm) is thickness direction retardation of the first phase difference layer at a 450 nm wavelength.

The liquid crystal display may further include a third phase difference layer disposed on or under the second phase difference layer, and between the light source and the first substrate, and the third phase difference layer may have a refractive index satisfying Relationship Equations 7 and 8.

$$n_{x3} > n_{z3} \qquad \text{Relationship Equation 7}$$

$$n_{y3} > n_{z3} \qquad \text{Relationship Equation 8}$$

In Relationship Equations 7 and 8, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

The third phase difference layer may have a refractive index satisfying Relationship Equation 9.

$$n_{x3} \geq n_{y3} > n_{z3} \qquad \text{Relationship Equation 9}$$

In Relationship Equation 9, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

The first phase difference layer and the third phase difference layer may have retardation satisfying Relationship Equation 10.

$$130 \text{ nm} \leq R_{th1}(450 \text{ nm}) + R_{th3}(450 \text{ nm}) \leq 310 \text{ nm} \qquad \text{Relationship Equation 10}$$

In Relationship Equation 10, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

The first phase difference layer and the third phase difference layer may each have phase difference satisfying Relationship Equations 11 and 12.

$$20 \text{ nm} \leq R_{th1}(450 \text{ nm}) \leq 290 \text{ nm} \qquad \text{Relationship Equation 11}$$

$$20 \text{ nm} \leq R_{th3}(450 \text{ nm}) \leq 290 \text{ nm} \qquad \text{Relationship Equation 12}$$

In Relationship Equations 11 and 12, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

The second phase difference layer may satisfy a refractive index of Relationship Equation 5-2.

$$n_{x2} > n_{y2} > n_{z2} \qquad \text{Relationship Equation 5-2}$$

wherein, in Relationship Equation 5-2, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

The second phase difference layer may have retardation satisfying Relationship Equations 6-2 and 6-3.

$$40 \text{ nm} \leq R_{in2}(450 \text{ nm}) \leq 110 \text{ nm} \qquad \text{Relationship Equation 6-2}$$

$$40 \text{ nm} \leq R_{th2}(450 \text{ nm}) \leq 200 \text{ nm} \qquad \text{Relationship Equation 6-3}$$

wherein, in Relationship Equations 6-2 and 6-3, $R_{in2}$ (450 nm) is in-plane retardation of the second phase difference layer at a 450 nm wavelength, and $R_{th2}$ (450 nm) is thickness direction retardation of the second phase difference layer at a 450 nm wavelength.

The first phase difference layer may have retardation satisfying Relationship Equation 2-2.

$$40 \text{ nm} \leq R_{th1}(450 \text{ nm}) \leq 260 \text{ nm} \qquad \text{Relationship Equation 2-2}$$

Wherein, in Relationship Equation 2-2, $R_{th1}$ (450 nm) is thickness direction retardation of the first phase difference layer at a 450 nm wavelength.

The light emitting element may include a quantum dot, a phosphor, or a combination thereof.

The second visible light may have a same wavelength as the first visible light or a longer wavelength than the first visible light.

The first visible light may be blue light and the second visible light may be blue light, green light, red light, or a combination thereof.

The liquid crystal panel may further include a pixel electrode and a common electrode facing each other in the center of the liquid crystal layer, and the liquid crystal layer may include liquid crystals aligned in a direction vertical to the first substrate and the second substrate in the absence of an electric field.

According to another embodiment, a liquid crystal display includes a color conversion layer, a first polarizing layer, a first phase difference layer, a common electrode, a liquid crystal layer, a pixel electrode, a second phase difference layer, a second polarizing layer, and a light source disposed in this order, wherein the color conversion layer includes a light emitting element configured to receive a first visible light from the light source and emit second visible light, and the second visible light has a same wavelength as the first visible light or a longer wavelength than the first visible light, wherein the first phase difference layer has a refractive index satisfying Relationship Equation 1, and the second phase difference layer has a refractive index satisfying Relationship Equations 3 and 4.

The second phase difference layer may have a refractive index satisfying Relationship Equation 5-1.

The first phase difference layer may have retardation satisfying Relationship Equation 2-1 and the second phase difference layer may have retardation satisfying Relationship Equation 6-1.

The liquid crystal display (LCD) may further include a third phase difference layer between the pixel electrode and the second polarizing layer, and the third phase difference layer may have a refractive index satisfying Relationship Equations 7 and 8.

The third phase difference layer may have a refractive index satisfying Relationship Equation 9.

The first phase difference layer and the third phase difference layer may each have retardation satisfying Relationship Equation 10.

The first phase difference layer and the third phase difference layer may have a phase difference satisfying Relationship Equations 11 and 12. The second phase difference layer may have a refractive index satisfying Relationship Equation 5-2.

The first phase difference layer may have retardation satisfying Relationship Equation 2-2, and the second phase difference layer may have retardation satisfying of Relationship Equations 6-2 and 6-3.

The first visible light may be blue light and the second visible light may be blue light, green light, red light, or a combination thereof.

A contrast ratio of a photoluminescent liquid crystal display (LCD) may be increased and display characteristics may be improved.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other aspects, advantages and features of this disclosure will become more apparent by describing in further detail exemplary embodiments thereof with reference to the accompanying drawings, in which.

DETAILED DESCRIPTION

Figure 1:
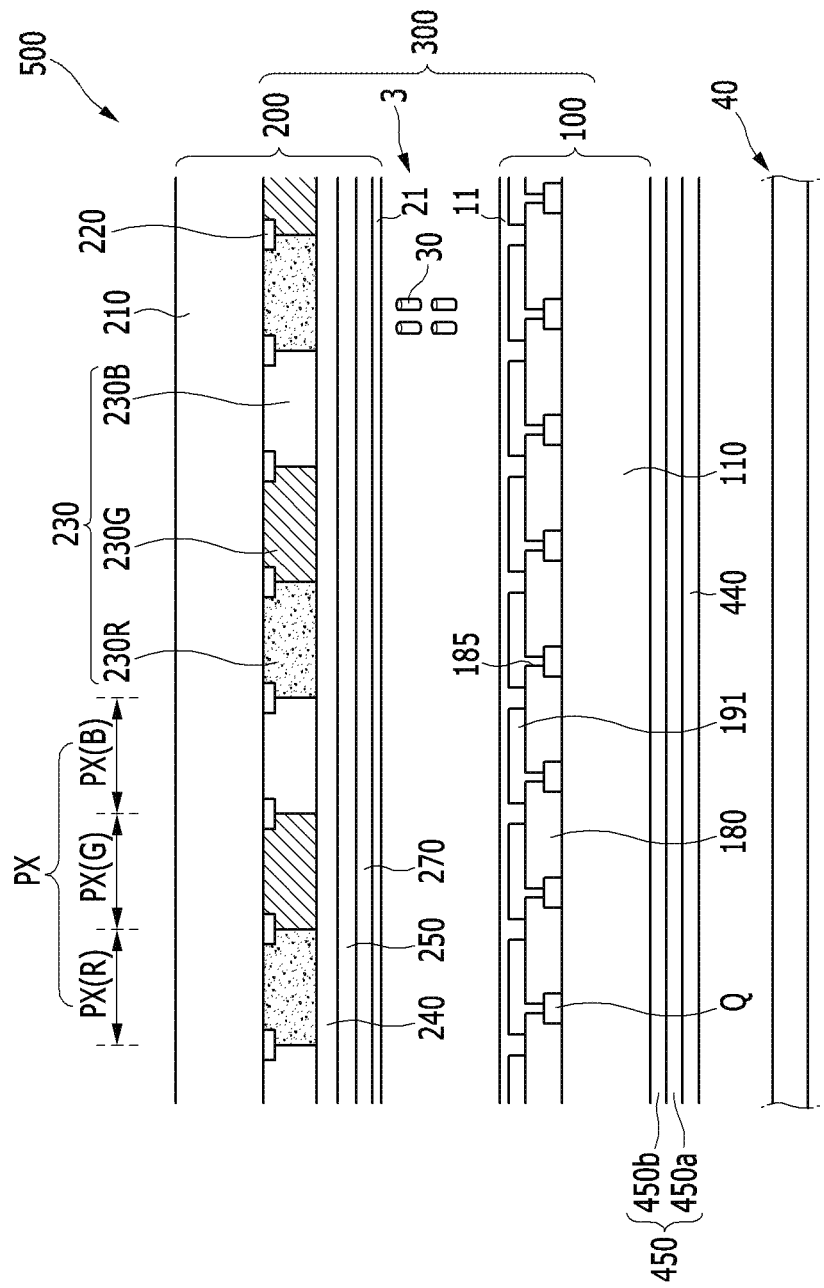
FIG. 1 is a schematic cross-sectional view showing a liquid crystal display (LCD) according to an embodiment.

Exemplary embodiments will hereinafter be described in detail, and may be easily performed by those who have common knowledge in the related art. However, this disclosure may be embodied in many different forms and is not construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a liquid crystal display (LCD) according to an embodiment is described with reference to drawings.

FIG. 1 is a schematic cross-sectional view of a liquid crystal display (LCD) according to an embodiment.

Referring to FIG. 1, the liquid crystal display 500 according to an embodiment includes a light source 40, a liquid crystal panel 300, a lower polarizing layer 440, and a lower phase difference layer 450.

The light source 40 may be a planar light source, a dot light source, or a line light source that supplies light to the liquid crystal panel 300, and may be, for example, disposed in the form of an edge-type light source or a direct type light source. The light source 40 may include a light emitting region including a light emitting element, a reflector disposed under the light emitting region and configured to reflect light emitted from the light emitting region, a light guide configured to supply the light emitted from the light emitting region toward a liquid crystal panel 300 and/or to at least one optical sheet disposed on the light guide, but is not limited thereto.

The light emitting element may be, for example a fluorescent lamp or a light emitting diode (LED), and for example, may supply light having a wavelength in a visible wavelength region (hereinafter, referred to as 'visible light'), for example blue light having relatively high energy.

The liquid crystal panel 300 includes a lower panel 100 disposed on the light source 40, an upper panel 200 facing the lower panel 100, and a liquid crystal layer 3 disposed between the lower panel 100 and the upper panel 200.

The lower panel 100 includes a lower substrate 110, a plurality of wires (not shown), a thin film transistor Q, a pixel electrode 191, and an alignment layer 11.

The lower substrate 110 may be, for example, an insulation substrate such as a glass substrate or a polymer substrate, and the polymer substrate may be made of, for example, a poly(ethylene terephthalate), poly(ethylene naphthalate), poly(carbonate), poly((C1-C6 alkyl)acrylate), poly(imide), or a combination thereof, but is not limited thereto.

A plurality of gate lines (not shown) that supply a gate signal and a plurality of data lines (not shown) that supply a data signal may be on the lower substrate 110 and may cross (e.g., intersect) one another, and a plurality of pixels PX are arranged in a form of a matrix defined by the gate lines and the data lines.

A plurality of thin film transistors Q are formed on the lower substrate 110. The thin film transistors Q may include a gate electrode (not shown) connected to the gate lines, a semiconductor (not shown) overlapping with the gate electrode, a gate insulating layer (not shown) disposed between the gate electrode and the semiconductor, a source electrode (not shown) connected to the data lines, and a drain electrode (not shown) facing the source electrode in the center of the semiconductor. In FIG. 1, each pixel PX includes one thin film transistor Q, but is not limited thereto, and two or more thin film transistors may be disposed.

A protective layer 180 is formed on the thin film transistor Q, and the protective layer 180 has a contact hole 185 defined therein exposing the thin film transistor Q.

A pixel electrode 191 is formed on the protective layer 180. The pixel electrode 191 may be made of a transparent conductor such as indium tin oxide (ITO) or indium zinc oxide (IZO), and is electrically connected to the thin film transistor Q through the contact hole 185. The pixel electrode 191 may have a predetermined pattern.

An alignment layer 11 is formed on the pixel electrode 191.

The upper panel 200 includes an upper substrate 210, a color conversion layer 230, an upper polarizing layer 240, an upper phase difference layer 250, a common electrode 270, and an alignment layer 21.

The upper substrate 210 may be, for example, an insulation substrate such as a glass substrate or a polymer substrate, and the polymer substrate may be made of, for example, polyethylene terephthalate, polyethylene naphthalate, polycarbonate, polyacrylate, polyimide, or a combination thereof, but is not limited thereto.

A light blocking member 220, also referred to as a black matrix, is formed on a surface of the upper substrate 210. The light blocking member 220 may block light leakage between the pixel electrodes 191.

In addition, a color conversion layer 230 is formed on one surface of the upper substrate 210. The color conversion layer 230 is configured to receive light having a predetermined wavelength and emits light having the same wavelength or light having a different wavelength to display one or more color. The color conversion layer 230 includes a photoluminescent material that is stimulated by light and emits light by itself, that is, a light emitting element. The light emitting element may be, for example, a quantum dot, a phosphor, or a combination thereof.

For example, the light emitting element may emit light having the same wavelength as the light supplied by (e.g., received from) the light source 40. Alternatively, the light emitting element may emit light having a longer wavelength than the light supplied by (received from) the light source 40. For example, when the light from the light source 40 is a blue light, the light emitting element may emit blue light in the same wavelength region or may emit light in a longer wavelength region than the blue light, for example red light or green light.

In this way, high photoconversion efficiency and low power consumption may be realized by including the color conversion layer 230 including a light emitting element.

In addition, the color conversion layer 230 including the light emitting element may significantly reduce an amount of light lost due to the absorption of the light and thus increase photoefficiency as compared to a color filter including a dye and/or a pigment which absorbs a considerable amount of light emitted from the light source and thus has low photoefficiency. In addition, color purity may be increased by an inherent luminous color of the light emitting element. Furthermore, the light emitting element emits light which is scattered in all directions and thus may improve viewing angle characteristics.

FIG. 1 shows a red conversion layer 230R including a red light emitting element configured to emit red light, a green conversion layer 230G including a green light emitting element configured to emit green light, and a blue conversion layer 230B including a blue light emitting element configured to emit blue light, but is not limited thereto. For example, the red conversion layer 230R may emit light in a wavelength region ranging from greater than about 590 nanometers (nm) to less than or equal to about 700 nm, the green conversion layer 230G may emit light in a wavelength region ranging from about 510 nm to about 590 nm, and the blue conversion layer 230B may emit light in a wavelength region ranging from greater than or equal to about 380 nm to less than about 510 nm. For example, the light emitting element may be a light emitting element emitting cyan light, a light emitting element emitting magenta light, and/or a light emitting element emitting yellow light, or may additionally include at least one of these light emitting elements. For example, when the light source 40 supplies blue light, the blue conversion layer 230B receives the light supplied directly from the light source 40 without a separate light emitting element and thus displays (e.g., emits) blue light.

Herein, the blue conversion layer 230B may be empty or include a transparent insulator.

The light emitting element may be, for example, a phosphor, a quantum dot, or a combination thereof.

For example, the red conversion layer 230R may include a red phosphor, including, for example, $Y_2O_2S$:Eu, $YVO_4$:Eu,Bi, $Y_2O_2S$:Eu,Bi, SrS:Eu, (Ca,Sr)S:Eu, $SrY_2S_4$:Eu, $CaLa_2S_4$:Ce, $(Sr,Ca,Ba)_3SiO_5$:Eu, $(Sr,Ca,Ba)_2Si_5N_8$:Eu, $(Ca,Sr)_2AlSiN_3$:Eu, or a combination thereof. For example, the green conversion layer 230G may include a green phosphor, including, for example, $YBO_3$:Ce,Tb, $BaMgAl_{10}O_{17}$:Eu,Mn, (Sr,Ca,Ba) $(Al,Ga)_2S_4$:Eu, ZnS:Cu, Al $Ca_8Mg\ SiO_{44}Cl_2$:Eu, Mn, $Ba_2SiO_4$:Eu, $(Ba,SO_2SiO_4)$:EU, $Ba_2(Mg,Zn)Si_2O_7$:Eu, $(Ba,Sr)Al_2O_4$:Eu, $Sr_2Si_3O_8.2SrCl_2$:Eu, $(Sr,Ca,Ba,Mg)P_2O_7N_8$:Eu,Mn, $(Sr,Ca,Ba,Mg)_3P_2O_8$:Eu,Mn, $Ca_3Sc_2Si_3O_{12}$:Ce, $CaSc_2O_4$:Ce, b-SiAlON:Eu, $Ln_2Si_3O_3N_4$:Tb, $(Sr,Ca,Ba)Si_2O_2N_2$:Eu, or a combination thereof.

For example, the red conversion layer 230 may include a quantum dot. The quantum dot may be a semiconductor nanocrystal, and may have various shapes, for example an isotropic semiconductor nanocrystal, a quantum rod, a quantum plate, or a combination thereof. Herein, the quantum rod may indicate a quantum dot having an aspect ratio of greater than about 1, for example an aspect ratio of greater than or equal to about 2, greater than or equal to about 3, or greater than or equal to about 5. For example, the quantum rod may have an aspect ratio of less than or equal to about 50, less than or equal to about 30, or less than or equal to about 20. The quantum dot may have, for example an average particle diameter (e.g., an average largest particle diameter for a non-spherical shape) of about 1 nm to about 100 nm, for example about 1 nm to about 80 nm, for example about 1 nm to about 50 nm, for example about 1 nm to 20 nm.

The quantum dot may control a light emitting wavelength by changing a size and/or a composition. For example, the quantum dot may include a Group 12-Group 16 compound, a Group 13-Group 15 compound, a Group 14-Group 16 compound, a Group 14 compound, or a combination thereof. The Group 12-Group 16 compound may be, for example a binary element compound including CdSe, CdTe, ZnS, ZnSe, ZnTe, ZnO, HgS, HgSe, HgTe, MgSe, MgS, or a combination thereof; a ternary element compound including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof; and a quaternary element compound including HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof. The Group 13-Group 15 compound may be a binary element compound including GaN, GaP, GaAs, GaSb, AlN, AlP, AlAs, AlSb, InN, InP, InAs, InSb, or a combination thereof; a ternary element compound including GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof; and a quaternary element compound including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof. The Group 14-Group 16 compound may include a binary element compound including SnS, SnSe, SnTe, PbS, PbSe, PbTe, or a combination thereof; a ternary element compound including SnSeS, SnSeTe, SnSTe, PbSeS, PbSeTe, PbSTe, SnPbS, SnPbSe, SnPbTe, or a combination thereof; and a quaternary element compound including SnPbSSe, SnPbSeTe, SnPbSTe, or a combination thereof. The Group 14 compound may include a single-element compound including Si, Ge, or a combination thereof; and a binary element compound including SiC, SiGe, or a combination thereof. A combination comprising at least one of the foregoing may also be used.

The quantum dot may include the binary element compound, the ternary element compound, or the quaternary element compound in a substantially uniform concentration distribution (e.g., homogeneous distribution) or in a different concentration distributions (e.g., heterogeneous distribution). The quantum dot may have a core-shell structure wherein one quantum dot surrounds another quantum dot. For example, the core and the shell of the quantum dot may have an interface, and an element of the core, the shell, or a combination thereof, may have a concentration gradient wherein the concentration of the element(s) of the shell decrease from an outer surface of the shell toward the core. For example, a material composition of the shell of the quantum dot has a higher energy bandgap than a material composition of the core of the quantum dot, and thereby the quantum dot may exhibit a quantum confinement effect. The quantum dot may have one core of a quantum dot and multiple shell layers surrounding the core (e.g., multi-shell structure). The multi-shell structure has at least two shells wherein each shell may be a single composition, an alloy, or a shell having a concentration gradient. For example, a shell of a multi-shell structure that is furthest away from the core may have a higher energy bandgap than a shell that is nearest to the core, and thereby the quantum dot may exhibit a quantum confinement effect.

The quantum dot may have a quantum yield of greater than or equal to about 10 percent (%), for example greater than or equal to about 30%, greater than or equal to about 50%, greater than or equal to about 60%, greater than or equal to about 70%, or greater than or equal to about 90%, but is not limited thereto. The quantum dot has a relatively narrow spectrum. For example, the quantum dot may have a full width at half maximum (FWHM) of a light emitting wavelength region of less than or equal to about 45 nm, for example less than or equal to about 40 nm, or less than or equal to about 30 nm.

The quantum dot may be included in the color conversion layer 230 in a form of a quantum dot-polymer composite wherein the quantum dot is dispersed in the polymer. The polymer may act as a matrix of the quantum dot-polymer composite, and the polymer is not particularly limited as long as it does not quench the quantum dot. The polymer may be a transparent polymer, including, for example a poly(vinylpyrrolidone), poly(styrene), poly(ethylene), poly(propylene), poly(methyl acrylate), poly(methyl methacrylate), poly(butyl methacrylate) (PBMA), a copolymer thereof, or a combination thereof, but is not limited thereto. The quantum dot-polymer composite may have a single layer or a multi-layer structure.

The upper polarizing layer 240 is disposed on a surface of the color conversion layer 230.

The upper polarizing layer 240 may be an in-cell polarizing layer within the liquid crystal panel 300 and may be disposed on a lower entire surface of the color conversion layer 230. The upper polarizing layer 240 may be disposed under the color conversion layer 230 and be configured to supply polarized light to the color conversion layer 230.

In this way, since the upper polarizing layer 240 is disposed beneath the color conversion layer 230, and since a separate polarizing plate attached outside of the liquid crystal panel 300 is not present, light emitted from the light emitting element of the color conversion layer 230 may not be influenced by the polarizing plate attached to an outside of the liquid crystal panel 300, and as a result, a contrast ratio may be improved. Specifically, the light emitting element of the color conversion layer 230 emits scattered light in which polarizing light is broken, and accordingly, if a polarizing plate is disposed on the color conversion layer 230 so that the scattered light passes through the polarizing plate, black luminance may be greatly increased, and thus a contrast ratio may be lowered. In addition, an effect of improving a viewing angle of a liquid crystal display (LCD) may not be hindered by the scattered light emitted from the light emitting element of the color conversion layer 230, but instead may be maintained.

Accordingly, an in-cell polarizing layer used as the upper polarizing layer 240 may prevent discoloring or image distortion due to an influence of a polarizing plate, attached outside of a liquid crystal panel, on light emitted from the light emitting element. Also, an in-cell polarizing layer used as the upper polarizing layer 240 may maintain inherent light emitting characteristics of the light emitting element and thus secure high color purity while simultaneously reducing a light loss. In addition, the in-cell polarizing layer is a thin film having a thickness of less than or equal to about 1 micrometer (μm) and thus may reduce an overall thickness of a liquid crystal display (LCD).

The upper polarizing layer 240 may be a linear polarizer that converts light emitted from the light source 40 and passed through the liquid crystal layer 3, into linear polarized light.

For example, the upper polarizing layer 240 may be made of, for example, elongated polyvinyl alcohol (PVA). The elongated PVA may be made according to a method of, for example, elongating a polyvinyl alcohol film, adsorbing iodine or a dichroic dye thereto, and borating and washing the same.

For example, the upper polarizing layer 240 may be a polarizing film prepared, for example, by mixing a polymer and a dichroic dye and melt blending the mixture at a temperature above the melting point of the polymer. The polymer may be a hydrophobic polymer, for example, a poly(olefin).

For example, the upper polarizing layer 240 may be a wire grid polarizer. The wire grid polarizer has a structure in which a plurality of metal wires are aligned in one direction, and accordingly, when incident light passes through the wire grid polarizer, light parallel to a metal wire is absorbed or reflected, but light perpendicular to a metal wire is transmitted and may form linear polarized light.

Herein, the linear polarized light may be more efficiently formed when a wavelength of light is wider than a gap between the metal wires. The wire grid polarizer may be appropriately applied as the in-cell polarizing layer and also, is thin and thus may obtain a thin liquid crystal display (LCD) 500.

The upper phase difference layer 250 is formed on a surface of the upper polarizing layer 240.

The upper phase difference layer 250 may be an in-cell phase difference layer within the liquid crystal panel 300. For example, the upper phase difference layer 250 may contact the upper polarizing layer 240. For example, a layer (not shown) may be disposed between the upper phase difference layer 250 and the upper polarizing layer 240, and may include an insulating layer such as silicon oxide and silicon nitride. The upper phase difference layer 250 may have one layer or two or more layers.

When the upper phase difference layer 250 is combined with a lower phase difference layer 450 outside of a lower panel 100 to adjust light retardation, a light leakage from the side direction, which occurs before light reaches the color conversion layer 230 in a black mode, may be reduced or prevented. Also, an unnecessary light emission of the color conversion layer 230 in the black mode may be reduced, and accordingly, black luminance may be decreased, and thus a contrast ratio may be improved.

The upper phase difference layer 250 may include a heat resistant polymer, a heat resistant liquid crystal, or a combination thereof. The heat resistant polymer may include, for example a polymer having a glass transition temperature (Tg) of greater than or equal to about 150° C., and may be, for example polyimide, polyamic acid, polyamide, polycarbonate, cycloolefin, or a combination thereof, but is not limited thereto. For example, the heat resistant polymer may have a glass transition temperature (Tg) of greater than or equal to about 180° C., for example greater than or equal to about 200° C., for example greater than or equal to about 220° C., for example greater than or equal to about 230° C.

For example, the upper phase difference layer 250 may include a liquid crystal layer made of liquid crystals having positive or negative birefringence and may further include an alignment layer on a surface of the liquid crystal layer.

For example, the upper phase difference layer 250 may be provided with a predetermined phase difference by elongating a film made of a heat resistant polymer in a uniaxial or biaxial direction. For example, the upper phase difference layer 250 may be endowed with a predetermined retardation to induce linear or surface alignment of a heat resistant polymer or a heat resistant liquid crystal during the drying step, when the heat resistant polymer or the heat resistant liquid crystal is prepared as a solution and then, coated and dried.

The common electrode 270 is formed on a surface of the upper phase difference layer 250. The common electrode 270 may be, for example made of a transparent conductor such as ITO or IZO and formed on an entire surface of the upper phase difference layer 250. The common electrode 270 has a predetermined pattern.

The alignment layer 21 is disposed on one surface of the common electrode 270.

The liquid crystal layer 3 including a plurality of liquid crystals 30 is disposed between the lower panel 100 and the upper panel 200. The liquid crystals 30 may have positive or negative dielectric anisotropy. For example, the liquid crystal 30 may have negative dielectric anisotropy. For example, the liquid crystal 30 may be aligned in a substantially vertical direction to the surfaces of the substrates 110 and 210 when an electric field is not applied to the pixel electrode 191 and the common electrode 270 (i.e., in the absence of an electric field). Thereby the liquid crystal display (LCD) 500 may be a vertical alignment liquid crystal display (LCD).

The lower polarizing layer 440 is attached to an outer surface of the lower panel 100. The lower polarizing layer 440 may be a linear polarizer and is configured to polarize light supplied from the light source 40 and to supply the polarized light to the liquid crystal layer 3.

For example, the lower polarizing layer 440 may be made of, for example, elongated polyvinyl alcohol (PVA) prepared according to a method of, for example, elongating a polyvinyl alcohol film, adsorbing iodine or a dichroic dye thereto, and borating and washing the same.

For example, the lower polarizing layer 440 may be a polarizing film prepared, for example, by mixing a polymer and a dichroic dye and melt blending the polymer with the dichroic dye at a temperature greater than the melting point of the polymer. The polymer may be a hydrophobic polymer, for example polyolefin.

For example, the lower polarizing layer 240 may be a wire grid polarizer. The wire grid polarizer is combined with the upper polarizing layer 240 to realize a thin liquid crystal display (LCD) 500.

The lower phase difference layer 450 may be attached to an outer surface of the lower panel 100 and may be disposed between the lower panel 100 and the lower polarizing layer 440. The lower phase difference layer 450 may be one layer or two or more layers.

As described above, the contrast ratio may be improved by combining the upper phase difference layer 250 with the lower phase difference layer 450 to adjust light retardation and thus reduce or prevent light leakage at the side before light reaches the color conversion layer 230 in a black mode, and accordingly, reduce the unnecessary light emission of the color conversion layer 230 in the black mode and thereby decrease black luminance. The combination of the upper phase difference layer 250 with the lower phase difference layer 450 may be variously designed to reduce the light leakage and increase the contrast ratio.

For example, the upper phase difference layer 250 may have, for example, a refractive index satisfying Relationship Equation 1.

$$n_{x1} \geq n_{y1} > n_{z1} \quad \text{Relationship Equation 1}$$

In Relationship Equation 1, $n_{x1}$ is a refractive index in a direction having a highest in-plane refractive index of the upper phase difference layer (hereinafter referred to as a slow axis), $n_{y1}$ is a refractive index in a direction having a lowest in-plane refractive index of the upper phase difference layer (hereinafter, referred to as a fast axis), and $n_{z1}$ is a refractive index in a direction perpendicular to the slow axis and fast axis of the upper phase difference layer.

In Relationship Equation 1, when $n_{x1}$ and $n_{y1}$ satisfy $n_{x1} > n_{y1}$, a refractive index of $n_{x1}$ is larger than a refractive index of $n_{y1}$ by about 0.02 or less, for example about 0.01 or less. Thereby, the upper phase difference layer 250 may have substantial in-plane isotropy.

The upper phase difference layer 250 may perform a compensation function to reduce a viewing angle dependency by satisfying the refractive index of Relationship Equation 1.

Retardation of the upper phase difference layer 250 may be expressed as in-plane retardation ($R_{in1}$) and thickness direction retardation ($R_{th1}$). The in-plane retardation ($R_{in1}$) of the upper phase difference layer 250 is retardation generated in an in-plane direction of the upper phase difference layer 250 and may be represented by $R_{in1}=(n_{x1}-n_{y1})d_1$. The thickness direction retardation ($R_{th1}$) of the upper phase difference layer 250 is retardation generated in a thickness direction of the upper phase difference layer 250 and may be represented by $R_{th1}=\{[(n_{x1}+n_{y1})/2]-n_{z1}\}d_1$. Herein, $d_1$ denotes a thickness of the upper phase difference layer 250.

The upper phase difference layer 250 may have an in-plane retardation and a thickness direction retardation within a predetermined range by variously changing the $n_{x1}$, $n_{y1}$, $n_{z1}$, and/or the thickness ($d_1$).

The upper phase difference layer 250 having refractive index satisfying Relationship Equation 1 may have, for example a thickness direction retardation satisfying Relationship Equation 2.

$$40 \text{ nm} \leq R_{th1}(450 \text{ nm}) \leq 310 \text{ nm} \quad \text{Relationship Equation 2}$$

In Relationship Equation 2, $R_{th1}$ (450 nm) is thickness direction retardation of the upper phase difference layer at a 450 nm wavelength.

A viewing angle dependency may be decreased and thus a compensation function may be performed by reducing or offsetting thickness direction retardation due to satisfaction of Relationship Equation 2.

Herein, the retardation is described based on a wavelength of 450 nm, but when a light emitting wavelength of the light source is changed, the reference wavelength may be changed and retardation may be also changed. For example, the retardation and the reference wavelength may be set to satisfy the following relationship:

$$0.25 \times \lambda_{BL}(\text{nm}) \leq R_{th}(\lambda_{BL}) \leq 0.70 \times \lambda_{BL}(\text{nm})$$

Wherein $\lambda_{BL}$ (nm) is a maximum light emitting wavelength of a light source), for example $0.28 \times \lambda_{BL}$ (nm) $\leq R_{th}(\lambda_{BL}) \leq 0.70 \times \lambda_{BL}$ (nm), for example $0.30 \times \lambda_{BL}$ (nm) $\leq R_{th}(\lambda_{BL}) \leq 0.70 \times \lambda_{BL}$ (nm), but is not limited thereto.

The upper phase difference layer 250 may have, for example thickness direction retardation satisfying Relationship Equation 2a.

$$40 \text{ nm} \leq R_{th1}(450 \text{ nm}) \leq 290 \text{ nm} \quad \text{Relationship Equation 2a}$$

The upper phase difference layer 250 may have, for example thickness direction retardation satisfying Relationship Equation 2b.

$$40 \text{ nm} \leq R_{th1}(450 \text{ nm}) \leq 270 \text{ nm} \quad \text{Relationship Equation 2b}$$

The upper phase difference layer 250 having a refractive index satisfying Relationship Equation 1 may have, for example in-plane retardation satisfying Relationship Equation 2'.

$$0 \text{ nm} \leq R_{in1}(450 \text{ nm}) \leq 20 \text{ nm} \quad \text{Relationship Equation 2'}$$

In Relationship Equation 2', $R_{in1}$ (450 nm) is in-plane retardation of the upper phase difference layer at a 450 nm wavelength.

The upper phase difference layer 250 may have, for example in-plane retardation satisfying Relationship Equation 2'a.

$$0 \text{ nm} \leq R_{in1}(450 \text{ nm}) \leq 10 \text{ nm} \quad \text{Relationship Equation 2'a}$$

The upper phase difference layer 250 may have, for example in-plane retardation satisfying Relationship Equation 2'b.

$$0 \text{ nm} \leq R_{in1}(450 \text{ nm}) \leq 5 \text{ nm} \quad \text{Relationship Equation 2'b}$$

The upper phase difference layer 250 may have, for example in-plane retardation satisfying Relationship Equation 2'c.

$$0 \text{ nm} \leq R_{in1}(450 \text{ nm}) \leq 2 \text{ nm} \quad \text{Relationship Equation 2'c}$$

When the upper phase difference layer 250 has a refractive index which satisfies Relationship Equation 1, the lower phase difference layer 450 may have, for example refractive indexes satisfying Relationship Equations 3 and 4.

$$n_{x2} > n_{y2} \quad \text{Relationship Equation 3}$$

$$n_{x2} > n_{z2} \quad \text{Relationship Equation 4}$$

In Relationship Equations 3 and 4, $n_{x2}$ is a refractive index at a slow axis of the lower phase difference layer, $n_{y2}$ is a refractive index at a fast axis of the lower phase difference layer, and $n_{z2}$ is a refractive index in a direction perpendicular to the slow axis and the fast axis of the lower phase difference layer.

The lower phase difference layer 450 may have, for example a refractive index satisfying Relationship Equation 5-1.

$$n_{x2} > n_{y2} \approx n_{z2} \qquad \text{Relationship Equation 5-1}$$

In Relationship Equation 5-1, $n_{y2}$ and $n_{z2}$ may be substantially equivalent, or completely the same and herein, regarded as substantially equivalent when the difference of refractive indexes between $n_{y2}$ and $n_{z2}$ is less than or equal to about 0.02, for example less than or equal to about 0.01.

The light leakage may be effectively reduced due to an effective compensation function by combining the upper phase difference layer 250 and the lower phase difference layer 450 having the refractive indexes.

Retardation of the lower phase difference layer 450 may be expressed as in-plane retardation ($R_{in2}$) and thickness direction retardation ($R_{th2}$). The in-plane retardation ($R_{in2}$) of the lower phase difference layer 450 is retardation generated in an in-plane direction of the lower phase difference layer 450 and may be represented by $R_{in2} = (n_{x2} - n_{y2})d_2$. The thickness direction retardation ($R_{th2}$) of the upper phase difference layer 450 is retardation generated in a thickness direction of the upper phase difference layer 450 and may be represented by $R_{th2} = \{[(n_{x2} + n_{y2})/2] - n_{z2}\}d_2$. Herein, $d_2$ denotes a thickness of the lower phase difference layer 450.

The lower phase difference layer 450 having refractive index satisfying Relationship Equation 5-1, may have, for example in-plane retardation satisfying Relationship Equation 6-1.

$$70 \text{ nm} \leq R_{in2}(450 \text{ nm}) \leq 170 \text{ nm} \qquad \text{Relationship Equation 6-1}$$

In Relationship Equation 6-1, $R_{in2}$ (450 nm) is in-plane retardation of the lower phase difference layer at a 450 nm wavelength.

A viewing angle dependency may be decreased and thus a compensation function may be performed by combining retardation of the upper phase difference layer 250 and the lower phase difference layer 450 due to satisfaction of Relationship Equation 6-1.

The lower phase difference layer 450 may have, for example in-plane retardation satisfying Relationship Equation 6a-1.

$$90 \text{ nm} \leq R_{in2}(450 \text{ nm}) \leq 150 \text{ nm} \qquad \text{Relationship Equation 6a-1}$$

The lower phase difference layer 450 may have, for example in-plane retardation satisfying Relationship Equation 6b-1.

$$100 \text{ nm} \leq R_{in2}(450 \text{ nm}) \leq 140 \text{ nm} \qquad \text{Relationship Equation 6b-1}$$

The lower phase difference layer 450 having a refractive index satisfying Relationship Equation 5-1 may have, for example thickness direction retardation satisfying Relationship Equation 6'-1 or 6"-1.

$$R_{in2}(450 \text{ nm})/2 - 10 \text{ nm} \leq R_{th2}(450 \text{ nm}) \leq R_{in2}(450 \text{ nm})/2 + 10 \text{ nm} \qquad \text{Relationship Equation 6'-1}$$

$$35 \text{ nm} \leq R_{th2}(450 \text{ nm}) \leq 85 \text{ nm} \qquad \text{Relationship Equation 6"-1}$$

In Relationship Equations 6'-1 and 6"-1, $R_{th2}$ (450 nm) is thickness direction retardation of the lower phase difference layer at a 450 nm wavelength and $R_{in2}$ (450 nm) is in-plane retardation of the lower phase difference layer at a 450 nm wavelength.

The lower phase difference layer 450 may have, for example thickness direction retardation satisfying Relationship Equation 6"a-1.

$$45 \text{ nm} \leq R_{th2}(450 \text{ nm}) \leq 75 \text{ nm} \qquad \text{Relationship Equation 6"a-1}$$

The lower phase difference layer 450 may have, for example thickness direction retardation satisfying Relationship Equation 6"b-1.

$$50 \text{ nm} \leq R_{th2}(450 \text{ nm}) \leq 70 \text{ nm} \qquad \text{Relationship Equation 6"b-1}$$

When the refractive index of the lower phase difference layer 450 satisfies Relationship Equation 5-1, the thickness direction retardation of the upper phase difference layer 250 may satisfy Relationship Equation 2-1.

$$130 \text{ nm} \leq R_{th1}(450 \text{ nm}) \leq 310 \text{ nm} \qquad \text{Relationship Equation 2-1}$$

When the refractive index of the lower phase difference layer 450 satisfies Relationship Equation 5-1, the thickness direction retardation of the upper phase difference layer 250 may satisfy Relationship Equation 2a-1.

$$150 \text{ nm} \leq R_{th1}(450 \text{ nm}) \leq 290 \text{ nm} \qquad \text{Relationship Equation 2a-1}$$

When the refractive index of the lower phase difference layer 450 satisfies Relationship Equation 5-1, the thickness direction retardation of the upper phase difference layer 250 may satisfy Relationship Equation 2b-1.

$$170 \text{ nm} \leq R_{th1}(450 \text{ nm}) \leq 270 \text{ nm} \qquad \text{Relationship Equation 2b-1}$$

The lower phase difference layer 450 may have, for example, one layer or two layers. When the lower phase difference layer 450 has two layers, the lower phase difference layer 450 may include, for example, a lower main phase difference layer 450a having a refractive index satisfying Relationship Equation 3 and 4 or a refractive index satisfying Relationship Equation 5 and a lower auxiliary phase difference layer 450b satisfying refractive indexes of Relationship Equations 7 and 8. The lower auxiliary phase difference layer 450b may be disposed on or under the lower main phase difference layer 450a.

$$n_{x3} > n_{z3} \qquad \text{Relationship Equation 7}$$

$$n_{y3} > n_{z3} \qquad \text{Relationship Equation 8}$$

In Relationship Equations 7 and 8, $n_{x3}$ is a refractive index at a slow axis of the lower auxiliary phase difference layer, $n_{y3}$ is a refractive index at a fast axis of the lower auxiliary phase difference layer, and $n_{z3}$ is a refractive index in a direction perpendicular to the slow axis and fast axis of the lower auxiliary phase difference layer.

The lower auxiliary phase difference layer 450b may have, for example a refractive index satisfying Relationship Equation 9.

$$n_{x3} \geq n_{y3} > n_{z3} \qquad \text{Relationship Equation 9}$$

In Relationship Equation 9, $n_{x3}$ is a refractive index at a slow axis of the lower auxiliary phase difference layer, $n_{y3}$ is a refractive index at a fast axis of the lower auxiliary phase difference layer, and $n_{z3}$ is a refractive index in a direction perpendicular to the slow axis and the fast axis of the lower auxiliary phase difference layer.

In Relationship Equation 9, when $n_{x3}$ and $n_{y3}$ satisfy $n_{x3} > n_{y3}$, a refractive index of $n_{x3}$ is larger than a refractive index of $n_{y3}$ by about 0.02 or less, for example about 0.01 or less. Thereby, the lower auxiliary phase difference layer 450b may have substantial in-plane isotropy.

Retardation of the lower auxiliary phase difference layer 450b may be expressed as in-plane retardation ($R_{in3}$) and thickness direction retardation ($R_{th3}$). The in-plane retardation ($R_{in3}$) of the lower auxiliary phase difference layer 450b is retardation generated in an in-plane direction of the upper phase difference layer 450b and may be represented by: $R_{in3}=(n_{x3}-n_{y3})d_3$. The thickness direction retardation ($R_{th3}$) of the lower auxiliary phase difference layer 450b is retardation generated in a thickness direction of the lower auxiliary phase difference layer 450b and may be represented by $R_{th3}=\{[(n_{x3}+n_{y3})/2]-n_{z3}\}d_3$. Herein, $d_3$ denotes a thickness of the lower auxiliary phase difference layer 450b.

The lower auxiliary phase difference layer 450b having a refractive index satisfying Relationship Equation 9 is combined with the upper phase difference layer 250 to have, for example retardation satisfying Relationship Equation 10.

$$130 \text{ nm} \leq R_{th1}(450 \text{ nm}) + R_{th3}(450 \text{ nm}) \leq 310 \text{ nm} \quad \text{Relationship Equation 10}$$

In Relationship Equation 10, $R_{th1}$ (450 nm) is thickness direction retardation of the upper phase difference layer at a 450 nm wavelength, and $R_{th3}$ (450 nm) is thickness direction retardation of the lower auxiliary phase difference layer at a 450 nm wavelength.

Within the retardation ranges satisfying Relationship Equation 10, the upper phase difference layer 250 and the lower auxiliary phase difference layer 450b may have a retardation satisfying Relationship Equations 11 and 12.

$$20 \text{ nm} \leq R_{th1}(450 \text{ nm}) \leq 290 \text{ nm} \quad \text{Relationship Equation 11}$$

$$20 \text{ nm} \leq R_{th3}(450 \text{ nm}) \leq 290 \text{ nm} \quad \text{Relationship Equation 12}$$

In Relationship Equations 11 and 12, $R_{th1}$ (450 nm) is thickness direction retardation of the upper phase difference layer at a 450 nm wavelength, $R_{th3}$ (450 nm) is thickness direction retardation of the lower auxiliary phase difference layer at a 450 nm wavelength.

The lower auxiliary phase difference layer 450b having retardation satisfying Relationship Equation 12 may have, for example in-plane retardation satisfying Relationship Equation 12'.

$$0 \text{ nm} \leq R_{in3}(450 \text{ nm}) \leq 20 \text{ nm} \quad \text{Relationship Equation 12'}$$

In Relationship Equation 12', $R_{in3}$ (450 nm) is in-plane retardation of the lower auxiliary phase difference layer at a 450 nm wavelength.

The lower auxiliary phase difference layer 450b may have, for example in-plane retardation satisfying Relationship Equation 12'a.

$$0 \text{ nm} \leq R_{in3}(450 \text{ nm}) \leq 10 \text{ nm} \quad \text{Relationship Equation 12'a}$$

The lower auxiliary phase difference layer 450b may have, for example in-plane retardation satisfying Relationship Equation 12'b.

$$0 \text{ nm} \leq R_{in3}(450 \text{ nm}) \leq 5 \text{ nm} \quad \text{Relationship Equation 12'b}$$

The lower phase difference layer 450 may satisfy, for example a refractive index of Relationship Equation 5-2.

$$n_{x2} > n_{y2} > n_{z2} \quad \text{Relationship Equation 5-2}$$

The light leakage may be effectively reduced due to an effective compensation function by combining the upper phase difference layer 250 and the lower phase difference layer 450 having the refractive indexes.

The lower phase difference layer 450 having refractive index satisfying Relationship Equation 5-2 may have, for example an in-plane retardation satisfying Relationship Equation 6-2.

$$40 \text{ nm} \leq R_{in2}(450 \text{ nm}) \leq 110 \text{ nm} \quad \text{Relationship Equation 6-2}$$

The lower phase difference layer 450 having a refractive index satisfying Relationship Equation 5-2 may have, for example a thickness direction retardation satisfying Relationship Equation 6-3.

$$40 \text{ nm} \leq R_{th2}(450 \text{ nm}) \leq 200 \text{ nm} \quad \text{Relationship Equation 6-3}$$

A viewing angle dependency may be decreased and thus a compensation function may be performed by combining retardation of upper phase difference layer 250 and the lower phase difference layer 450 due to satisfaction of Relationship Equations 6-2 and/or 6-3.

For example, the lower phase difference layer 450 may have in-plane retardation satisfying Relationship Equation 6a-2.

$$50 \text{ nm} \leq R_{in2}(450 \text{ nm}) \leq 100 \text{ nm} \quad \text{Relationship Equation 6a-2}$$

For example, the lower phase difference layer 450 may have in-plane retardation satisfying Relationship Equation 6b-2.

$$60 \text{ nm} \leq R_{in2}(450 \text{ nm}) \leq 90 \text{ nm} \quad \text{Relationship Equation 6b-2}$$

For example, the lower phase difference layer 450 having a refractive index satisfying Relationship Equation 5-2 may have, for example thickness direction retardation satisfying Relationship Equation 6'-3.

$$60 \text{ nm} \leq R_{th2}(450 \text{ nm}) \leq 180 \text{ nm} \quad \text{Relationship Equation 6'-3}$$

For example, the lower phase difference layer 450 having a refractive index satisfying Relationship Equation 5-2 may have, for example thickness direction retardation satisfying Relationship Equation 6''-3.

$$80 \text{ nm} \leq R_{th2}(450 \text{ nm}) \leq 160 \text{ nm} \quad \text{Relationship Equation 6''a-3}$$

For example, the lower phase difference layer 450 having a refractive index satisfying Relationship Equation 5-2 may have, for example, thickness direction retardation satisfying Relationship Equation 6''b-3.

$$90 \text{ nm} \leq R_{th2}(450 \text{ nm}) \leq 150 \text{ nm} \quad \text{Relationship Equation 6''b-3}$$

When the refractive index of the lower phase difference layer 450 satisfies Relationship Equation 5-2, the thickness direction retardation of the upper phase difference layer 250 may satisfy Relationship Equation 2-2.

$$40 \text{ nm} \leq R_{th1}(450 \text{ nm}) \leq 260 \text{ nm} \quad \text{Relationship Equation 2-2}$$

When the refractive index of the lower phase difference layer 450 satisfies Relationship Equation 5-2, the thickness direction retardation of the upper phase difference layer 250 may satisfy Relationship Equation 2a-2.

$$60 \text{ nm} \leq R_{th1}(450 \text{ nm}) \leq 250 \text{ nm} \quad \text{Relationship Equation 2a-2}$$

When the refractive index of the lower phase difference layer 450 satisfies Relationship Equation 5-2, the thickness direction retardation of the upper phase difference layer 250 may satisfy Relationship Equation 2b-2.

$$70 \text{ nm} \leq R_{th1}(450 \text{ nm}) \leq 240 \text{ nm} \quad \text{Relationship Equation 2b-2}$$

According to the embodiment, the liquid crystal display (LCD) displays a color by using a color conversion layer including a light emitting element and thus may increase photoefficiency and improve color characteristics. In addition, light characteristics and viewing angle characteristics of the color conversion layer including a light emitting element may be secured, and thus display characteristics may be improved by introducing an upper polarizing layer and an upper phase difference layer inside a liquid crystal panel, but omitting a polarizer and a phase difference film on the outside of an upper substrate to prevent deterioration of light characteristics and color characteristics which are attributed to the presence of the polarizer and the phase difference film on the outside of the upper substrate. In addition, the upper polarizing layer and the upper phase difference layer are thin and thus may by use to manufacture a thin liquid crystal display (LCD).

Hereinafter, the aforementioned embodiments are illustrated in more detail through the examples. However, these examples are exemplary, and the present disclosure is not limited thereto.

EXAMPLES

Optical Simulation

The following structures of a liquid crystal display (LCD) are simulated and an optical simulations are performed.

The optical simulations are performed using a TECHWIZ LCD™ simulation software program (Sanayi System Co., Ltd.) to obtain a black luminance distribution at a 450 nm wavelength and at an azimuthal angle of 0° to about 360° and a side angle of 0° to about 90° and calculate its average.

Example 1

An optical simulation based upon a liquid crystal display (LCD) including an upper substrate (a glass substrate); an upper polarizing layer; an upper phase difference layer; a homeotropic liquid crystal layer; a lower substrate (a glass substrate); a lower phase difference layer; a lower polarizing layer; and a blue light source, in order from the observer, is performed. Input variables of each layer are as follows.

Refractive indexes of the upper and lower substrates (glass substrates): 1.5.
Thicknesses of the upper and lower substrates (glass substrates): 500 μm.
Transmittance of the upper and lower polarizing layers: 42.45%.
Degrees of polarization of the upper and lower polarizing layers: 99.99%.
Refractive index (ne, no) of the homeotropic liquid crystal layer:
ne=1.6163 and no=1.4956.
Average refractive index of the upper phase difference layer: 1.60.
nx-nz of the upper phase difference layer: 0.052.
Average refractive index of the lower phase difference layer: 1.65.
nx-nz of the lower phase difference layer: 0.0026.
Blue light source: 450 nm short wavelength light source.

The optical simulations are performed within various ranges satisfying the following optical conditions.

Homeotropic liquid crystal layer: $R_{th}$=−295 nm,
Upper phase difference layer: $n_{x1}=n_{y1}>n_{z1}$, $R_{in1}$=0 nm, $R_{th1}$=160 to 280 nm, and
Lower phase difference layer: $n_{x2}>n_{y2}=n_{z2}$, $R_{in2}$=60 to 180 nm, $R_{th2}$=30 to 90 nm Example 2

An optical simulation is performed using the same liquid crystal display (LCD) as Example 1 except for changing the optical conditions of the homeotropic liquid crystal layer and the upper phase difference layer as follows.

Homeotropic liquid crystal layer: $R_{th}$=−275 nm.
Upper phase difference layer: $n_{x1}=n_{y1}>n_{z1}$, $R_{in1}$=0 nm, $R_{th1}$=140 to 260 nm.

Example 3

An optical simulation is performed using the same liquid crystal display (LCD) as Example 1 except for changing the optical conditions of the homeotropic liquid crystal layer and the upper phase difference layer as follows.

Homeotropic liquid crystal layer: $R_{th}$=−315 nm.
Upper phase difference layer: $n_{x1}=n_{y1}>n_{z1}$, $R_{in1}$=0 nm, $R_{th1}$=180 to 300 nm.

Example 4

An optical simulation is performed using the same liquid crystal display (LCD) as Example 1 except for changing the optical conditions of the homeotropic liquid crystal layer and the upper phase difference layer as follows.

Homeotropic liquid crystal layer: $R_{th}$=−255 nm.
Upper phase difference layer: $n_{x1}=n_{y1}>n_{z1}$, $R_{in1}$=0 nm, $R_{th1}$=120 to 240 nm.

Example 5

An optical simulation is performed using the same liquid crystal display (LCD) as Example 1 except for changing the optical conditions of the homeotropic liquid crystal layer and the upper phase difference layer as follows.

$R_{th}$ of homeotropic liquid crystal layer=−335 nm.
Upper phase difference layer: $n_{x1}=n_{y1}>n_{z1}$, $R_{in1}$=0 nm, $R_{th1}$=200 to 320 nm.

Example 6

An optical simulation is performed using the same liquid crystal display (LCD) as Example 1 except further including a lower auxiliary phase difference layer between the lower substrate and the lower phase difference layer and changing the optical conditions of the upper phase difference layer as follows.

Upper phase difference layer: $n_{x1}=n_{y1}>n_{z1}$, =0 nm, $R_{th1}$=110 nm
Lower auxiliary phase difference layer: $n_{x3}=n_{y3}>n_{z3}$, $R_{in3}$=0 nm, $R_{th3}$=110 nm.

Example 7

An optical simulation is performed using the same liquid crystal display (LCD) as Example 1 except changing the optical conditions of the homeotropic liquid crystal layer, the upper phase difference layer, and the lower phase difference layer as follows.

Homeotropic liquid crystal layer: $R_{th}$=−295 nm.
Upper phase difference layer: $n_{x1}=n_{y1}>n_{z1}$, $R_{in1}$=0 nm, $R_{th1}$=40−260 nm.
Lower phase difference layer: $n_{x2}>n_{y2}>n_{z2}$, $R_{in2}$=40~110 nm, $R_{th2}$=40~200 nm.

Comparative Example 1

An optical simulation is performed using the same liquid crystal display (LCD) as Example 1 except the upper phase difference layer and the lower phase difference layer were not included.

Comparative Example 2

An optical simulation is performed using the same liquid crystal display (LCD) as Example 1 except for the upper phase difference layer was not included and the optical condition of the lower phase difference layer was changed as follows.

Lower phase difference layer: $n_{x2} > n_{y2} = n_{z2}$, $R_{in2} = 120$ nm, $R_{th2} = 60$ m.

Comparative Example 3

An optical simulation is performed using the same liquid crystal display (LCD) as Example 1 except the upper phase difference layer was not included and the optical condition of the lower phase difference layer was changed as follows.

Lower phase difference layer: $n_{x2} \neq n_{y2} > n_{z2}$, $R_{in2} = 65$ nm, $R_{th2} = 250$ nm.

Evaluation 1

The optical simulation results are obtained as a black luminance distribution at a 450 nm wavelength and at an azimuthal angle from 0° to 360° and a side angle of 0° to 90°, and these results are shown in FIGS. 2 to 8.

Figure 2:
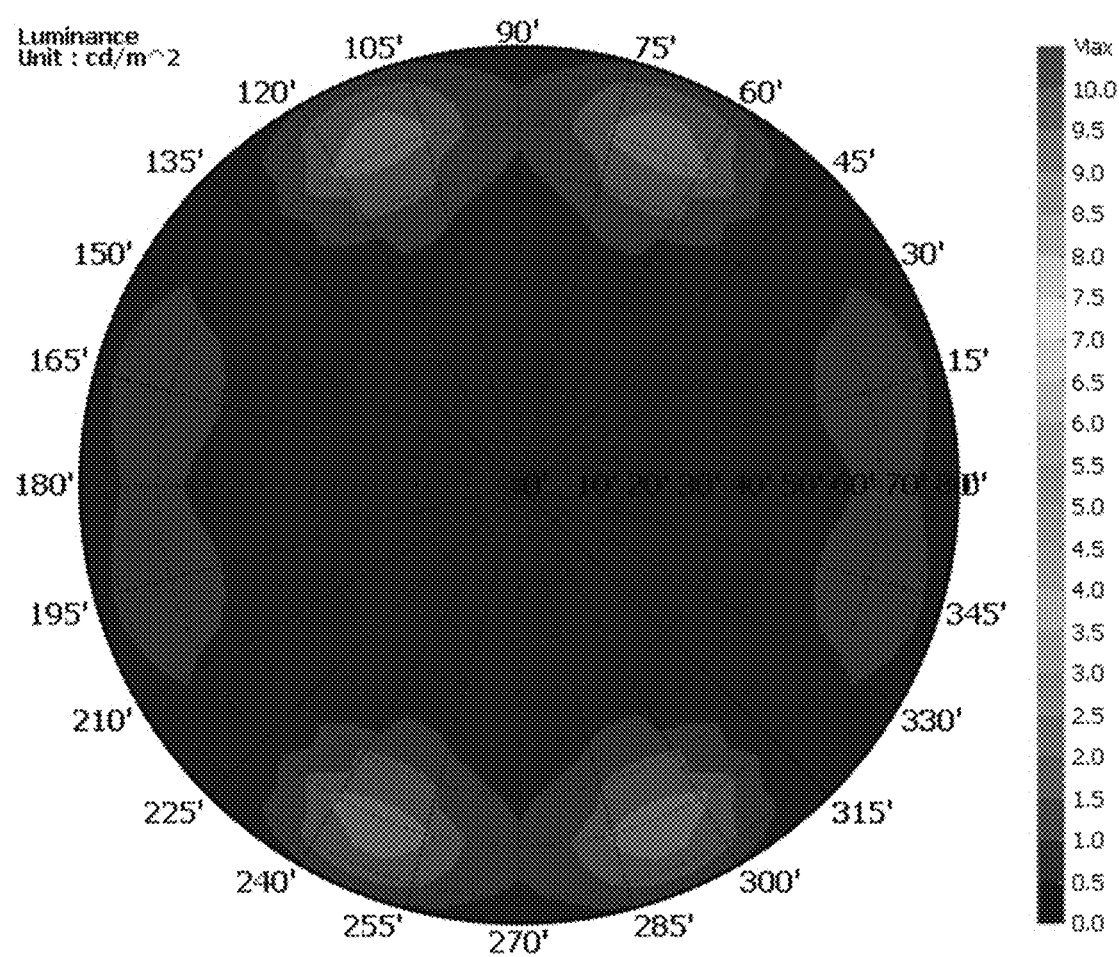
FIG. 2 is a color diagram showing a distribution of black luminance in the liquid crystal display (LCD) according to Example 1.
Figure 3:
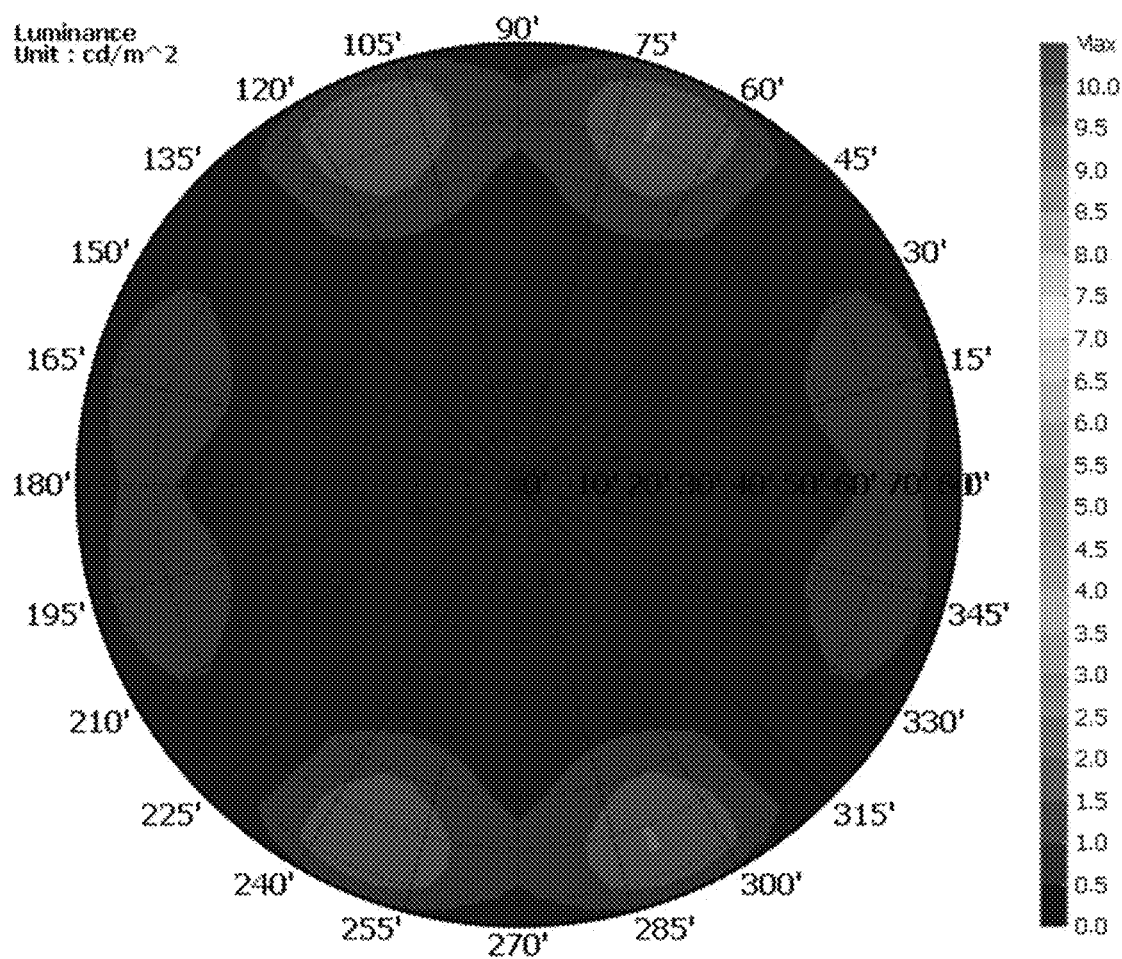
FIG. 3 is a color diagram showing a distribution of black luminance in the liquid crystal display (LCD) according to Example 2.
Figure 4:
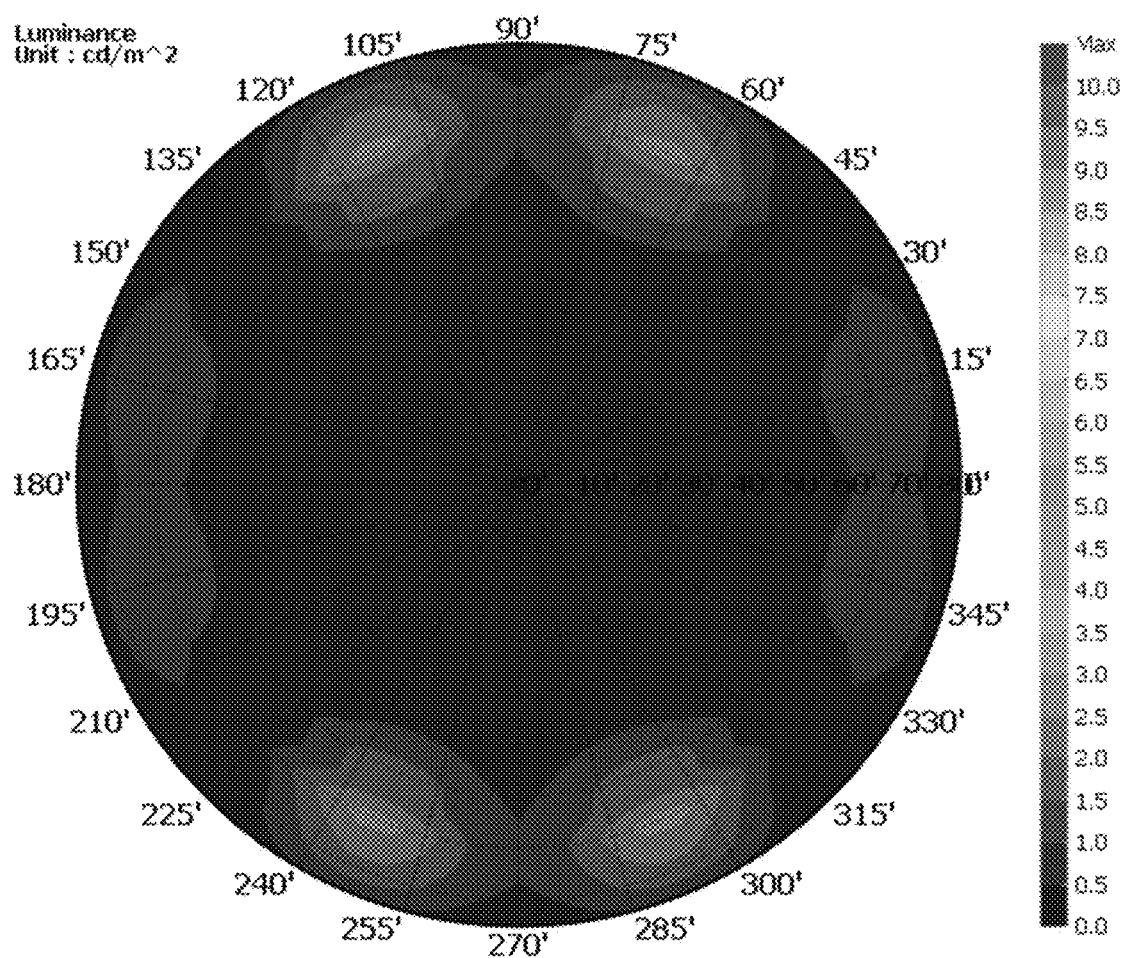
FIG. 4 is a color diagram showing a distribution of black luminance in the liquid crystal display (LCD) according to Example 3.
Figure 5:
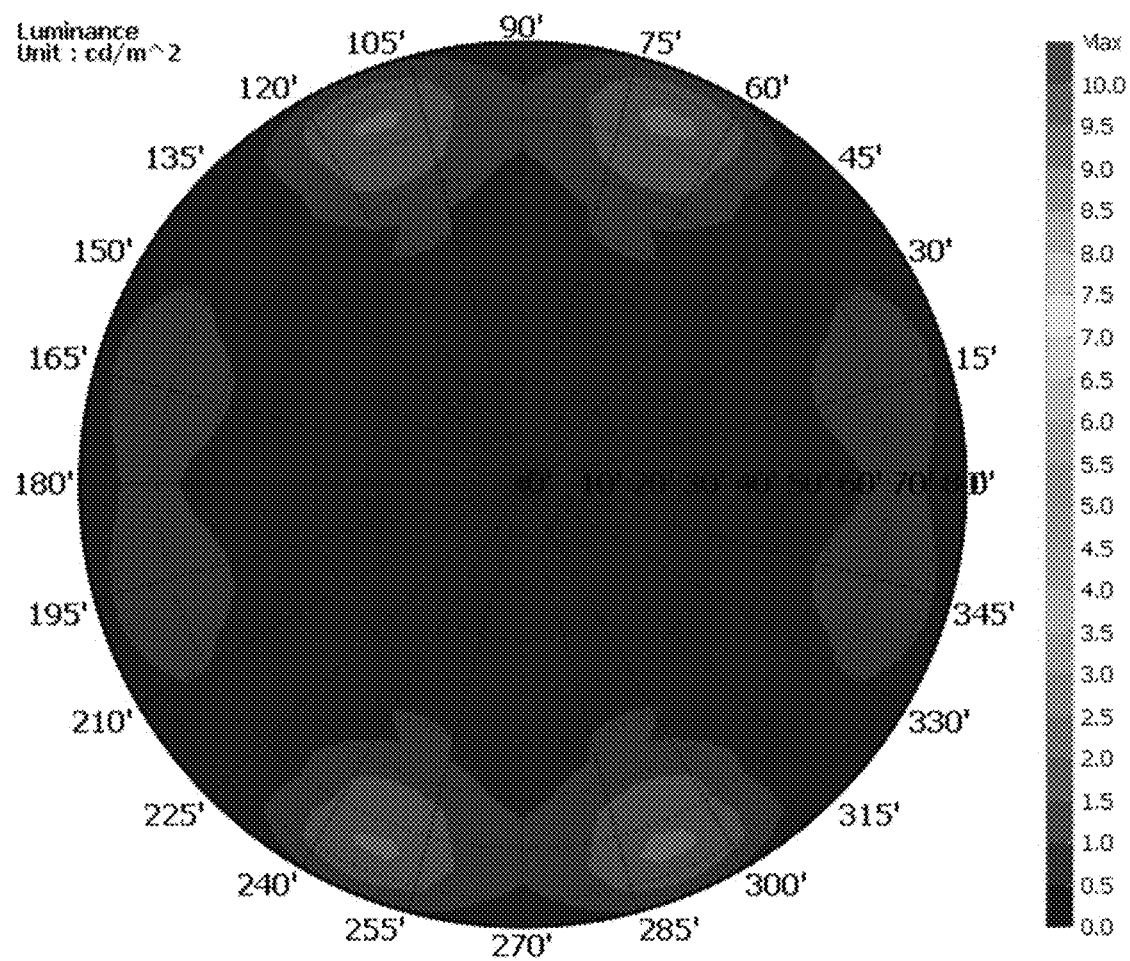
FIG. 5 is a color diagram showing a distribution of black luminance in the liquid crystal display (LCD) according to Example 6.
Figure 6:
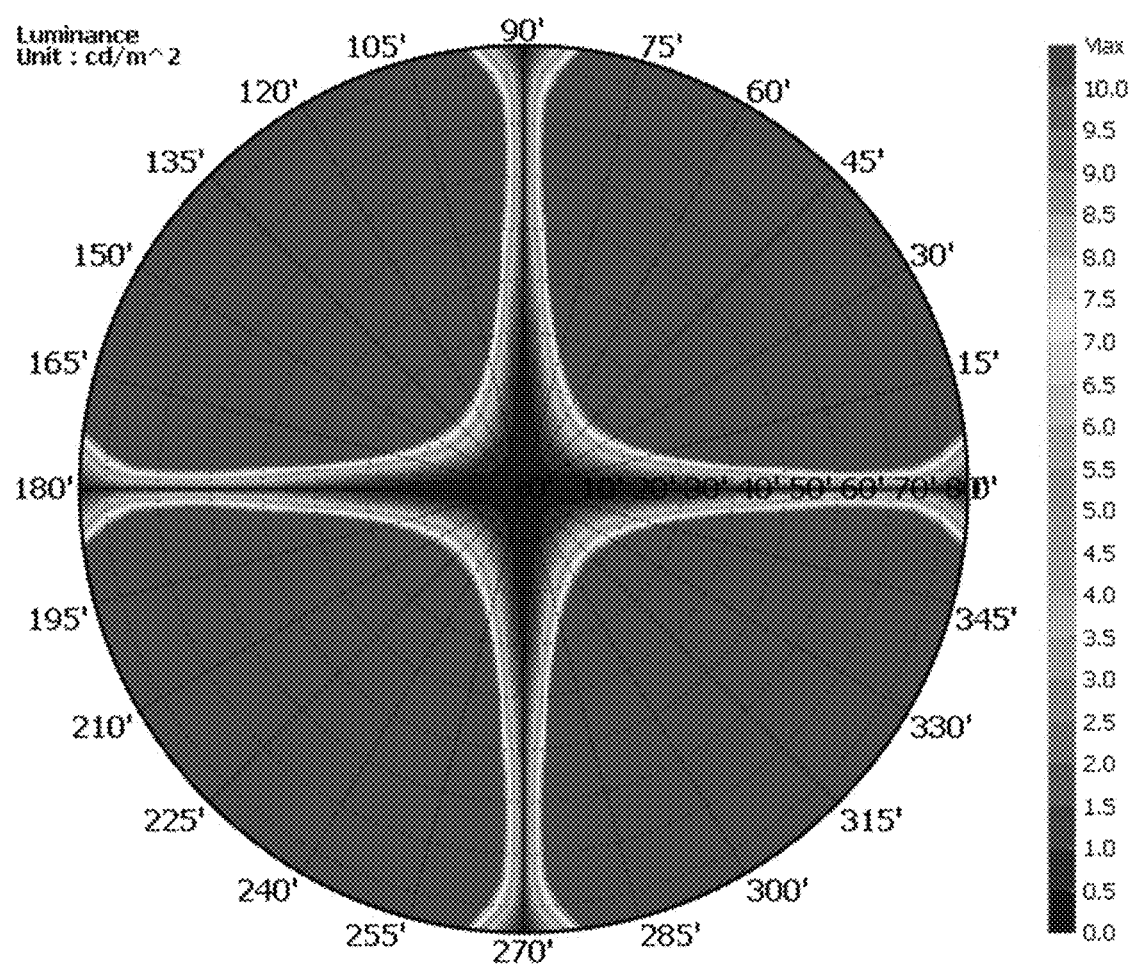
FIG. 6 is a color diagram showing a distribution of black luminance in the liquid crystal display (LCD) according to Comparative Example 1.
Figure 7:
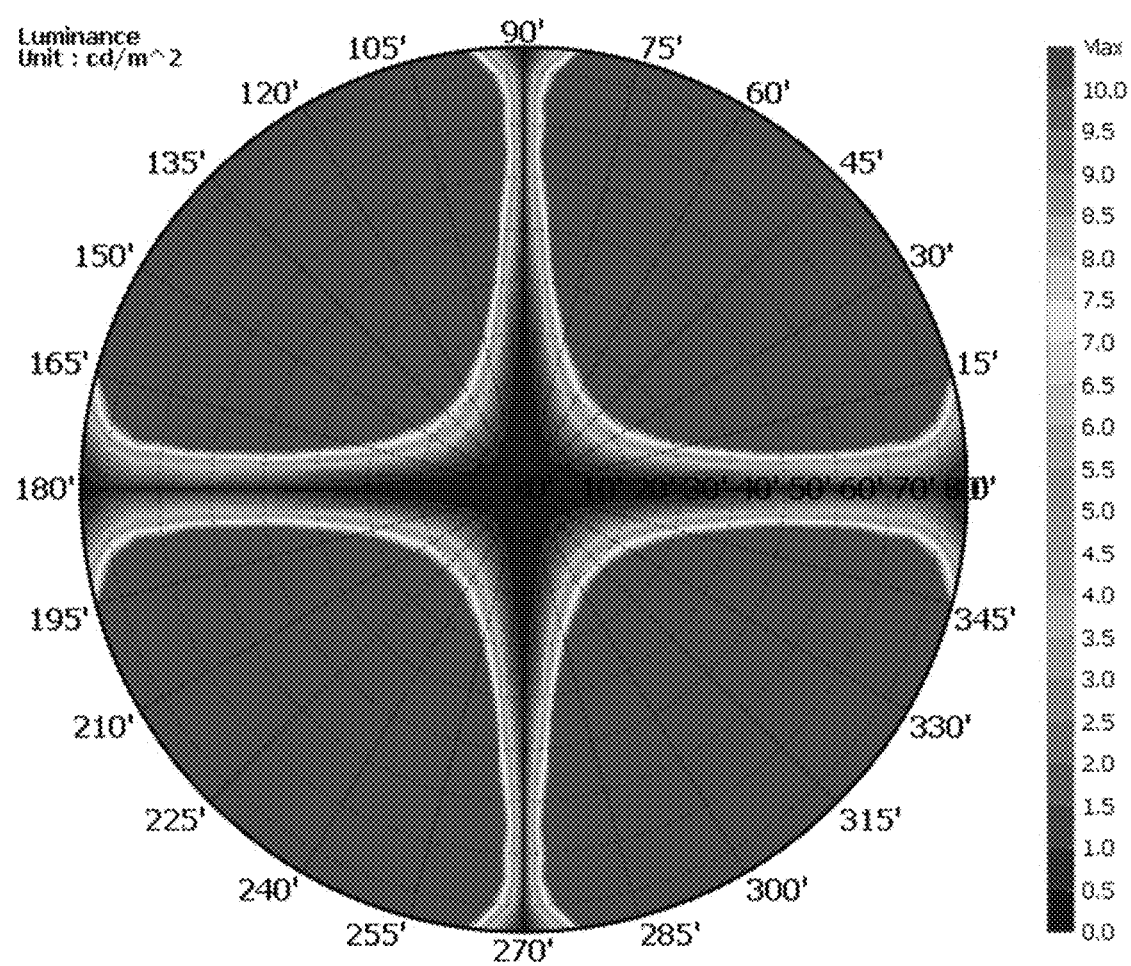
FIG. 7 is a color diagram showing a distribution of black luminance in the liquid crystal display (LCD) according to Comparative Example 2.
Figure 8:
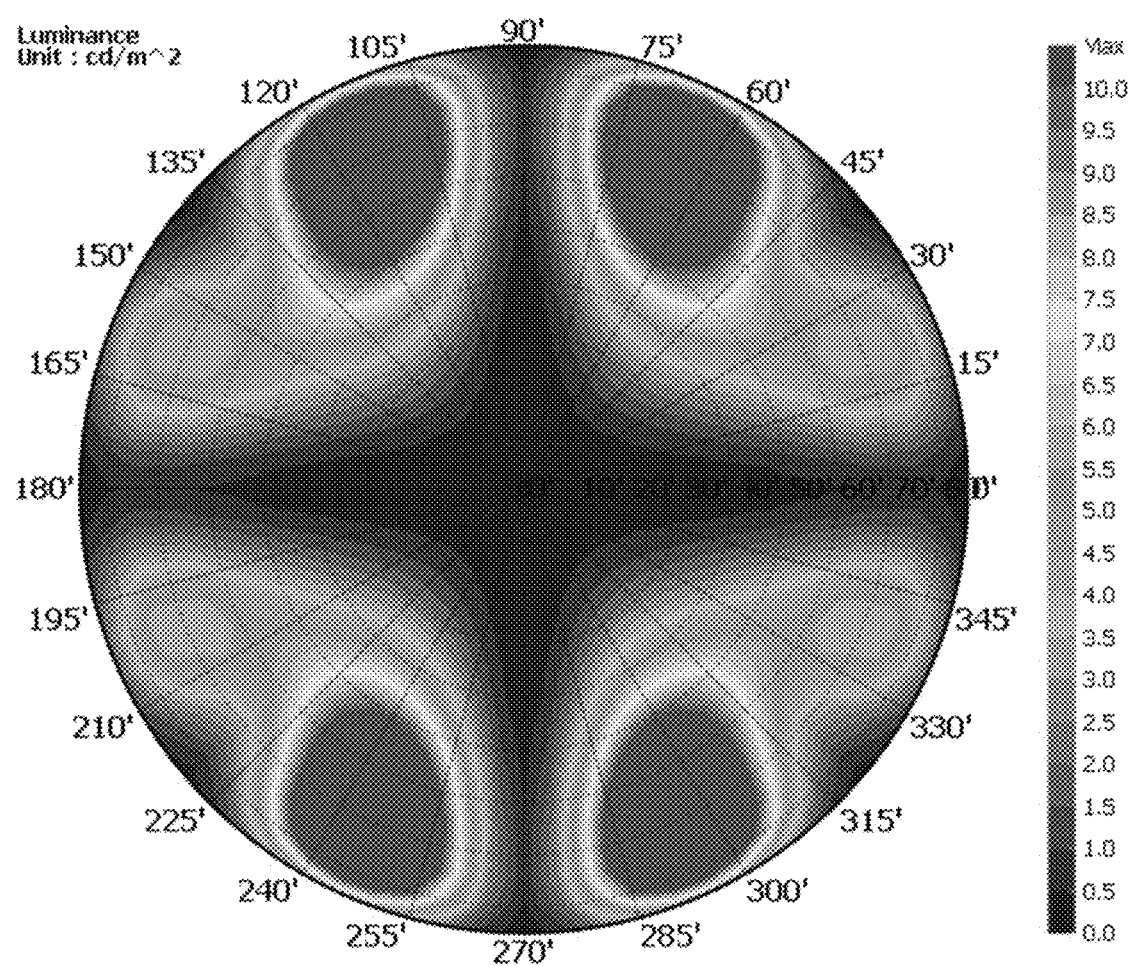
FIG. 8 is a color diagram showing a distribution of black luminance in the liquid crystal display (LCD) according to Comparative Example 3.

FIG. 2 is a color diagram showing a distribution of black luminance of the liquid crystal display (LCD) according to Example 1 ($R_{th1} = 220$ nm, $R_{in2} = 120$ nm); FIG. 3 is a color diagram showing a distribution of black luminance of the liquid crystal display (LCD) according to Example 2 ($R_{th1} = 200$ nm, $R_{in2} = 120$ nm); FIG. 4 is a color diagram showing a distribution of black luminance of the liquid crystal display (LCD) according to Example 3 ($R_{th1} = 240$ nm, $R_{in2} = 120$ nm); FIG. 5 is a color diagram showing a distribution of black luminance of the liquid crystal display (LCD) according to Example 6; FIG. 6 is a color diagram showing a distribution of black luminance of the liquid crystal display (LCD) according to Comparative Example 1; FIG. 7 is a color diagram showing a distribution of black luminance of the liquid crystal display (LCD) according to Comparative Example 2; and FIG. 8 is a color diagram showing a distribution of black luminance of the liquid crystal display (LCD) according to Comparative Example 3.

A sum of the black luminances at all the azimuthal angles and all the side angles may be proportional to a light dose reaching a color conversion layer in a black mode, and as the sum of the black luminances is smaller in the black mode, a light dose emitted by the color conversion layer in the black mode is decreased, and thus the black luminance may be lowered. Accordingly, as the black luminance is decreased, a liquid crystal display (LCD) may be expected to have a higher contrast ratio.

Referring to FIGS. 2 to 8, the liquid crystal displays (LCD) according to Examples 1 to 3 and 6 maintain low black luminance at all the azimuthal angles and all the side angles and thus show a high contrast ratio compared with the liquid crystal displays (LCD) according to Comparative Examples 1 to 3.

Evaluation 2

Average black luminance of the liquid crystal displays (LCD) according to Examples 1 to 7 and Comparative Examples 1 to 3 is evaluated.

The average black luminance may be obtained by averaging each black luminance at all the azimuthal angles and all the side angles. As the average black luminance decreases, a liquid crystal display (LCD) may be expected to have a higher contrast ratio.

The results are shown in Tables 1 to 3.

TABLE 1

| | Liquid crystal layer | Upper phase difference layer | | Lower phase difference layer | | Average black luminance | Relative to Comparative Example 3 |
|---|---|---|---|---|---|---|---|
| | $R_{th}$ (nm) | $R_{in1}$ (nm) | $R_{th1}$ (nm) | $R_{in2}$ (nm) | $R_{th2}$ (nm) | (cd/m²) | (%) |
| Comp. Ex. 1 | −295 | — | — | — | — | 101.392 | 3111% |
| Comp. Ex. 2 | −295 | — | — | 120 | 60 | 58.270 | 1788% |
| Comp. Ex. 3 | −295 | — | — | 65 | 250 | 3.259 | 100% (ref.) |
| Ex. 1 | −295 | 0 | 180 | 120 | 60 | 2.894 | 89% |
| | | 0 | 200 | 120 | 60 | 1.094 | 34% |
| | | 0 | 220 | 120 | 60 | 0.345 | 11% |
| | | 0 | 240 | 120 | 60 | 0.635 | 19% |
| | | 0 | 260 | 120 | 60 | 2.005 | 62% |
| | | 0 | 220 | 80 | 40 | 2.620 | 80% |
| | | 0 | 220 | 100 | 50 | 0.961 | 30% |
| | | 0 | 220 | 120 | 60 | 0.345 | 11% |
| | | 0 | 220 | 140 | 70 | 0.886 | 27% |
| | | 0 | 220 | 160 | 80 | 2.581 | 79% |
| Ex. 2 | −275 | 0 | 160 | 120 | 60 | 2.792 | 86% |
| | | 0 | 180 | 120 | 60 | 1.059 | 32% |
| | | 0 | 200 | 120 | 60 | 0.330 | 10% |
| | | 0 | 220 | 120 | 60 | 0.651 | 20% |
| | | 0 | 240 | 120 | 60 | 2.028 | 62% |
| Ex. 3 | −315 | 0 | 200 | 120 | 60 | 2.916 | 89% |
| | | 0 | 220 | 120 | 60 | 1.135 | 35% |
| | | 0 | 240 | 120 | 60 | 0.357 | 11% |
| | | 0 | 260 | 120 | 60 | 0.650 | 20% |
| | | 0 | 280 | 120 | 60 | 1.953 | 60% |
| Ex. 4 | −255 | 0 | 140 | 120 | 60 | 2.685 | 82% |
| | | 0 | 160 | 120 | 60 | 1.010 | 31% |
| | | 0 | 180 | 120 | 60 | 0.322 | 10% |
| | | 0 | 200 | 120 | 60 | 0.683 | 21% |
| | | 0 | 220 | 120 | 60 | 2.068 | 63% |
| Ex. 5 | −335 | 0 | 220 | 120 | 60 | 2.920 | 90% |
| | | 0 | 240 | 120 | 60 | 1.150 | 35% |
| | | 0 | 260 | 120 | 60 | 0.345 | 11% |
| | | 0 | 280 | 120 | 60 | 0.643 | 20% |
| | | 0 | 300 | 120 | 60 | 2.027 | 62% |

TABLE 2

| | Liquid crystal layer | Upper phase difference layer | | Lower phase difference layer | | lower auxiliary phase difference layer | lower auxiliary phase difference layer | Average black luminance | Relative to Comparative Example 3 |
|---|---|---|---|---|---|---|---|---|---|
| | $R_{th}$ (nm) | $R_{in1}$ (nm) | $R_{th1}$ (nm) | $R_{in2}$ (nm) | $R_{th2}$ (nm) | $R_{in3}$ (nm) | $R_{th3}$ (nm) | (cd/m²) | (%) |
| Example 6 | −295 | 0 | 110 | 120 | 60 | 0 | 110 | 0.331 | 10% |

TABLE 3

| | Liquid crystal layer | Upper phase difference layer | | Lower phase difference layer | | Average black luminance (cd/m$^2$) | Relative to Comparative Example 3 (%) |
|---|---|---|---|---|---|---|---|
| | $R_{th}$ (nm) | $R_{in1}$ (nm) | $R_{th1}$ (nm) | $R_{in2}$ (nm) | $R_{th2}$ (nm) | | |
| Comp. Ex. 1 | −295 | — | — | — | — | 101.392 | 3111% |
| Comp. Ex. 2 | −295 | — | — | 120 | 60 | 58.270 | 1788% |
| Comp. Ex. 3 | −295 | — | — | 65 | 250 | 3.259 | 100% (ref.) |
| Ex. 7 | −295 | 0 | 40 | 60 | 200 | 2.653 | 81% |
| | | 0 | 50 | 60 | 200 | 1.811 | 56% |
| | | 0 | 80 | 60 | 200 | 0.822 | 25% |
| | | 0 | 110 | 60 | 200 | 2.218 | 68% |
| | | 0 | 100 | 75 | 150 | 1.873 | 57% |
| | | 0 | 120 | 75 | 150 | 0.826 | 25% |
| | | 0 | 140 | 75 | 150 | 0.811 | 25% |
| | | 0 | 160 | 75 | 150 | 1.817 | 56% |
| | | 0 | 150 | 95 | 100 | 1.777 | 55% |
| | | 0 | 170 | 95 | 100 | 0.658 | 20% |
| | | 0 | 180 | 95 | 100 | 0.492 | 15% |
| | | 0 | 200 | 95 | 100 | 0.945 | 29% |
| | | 0 | 220 | 95 | 100 | 2.429 | 75% |
| | | 0 | 100 | 70 | 135 | 2.916 | 89% |
| | | 0 | 120 | 70 | 135 | 1.187 | 36% |
| | | 0 | 140 | 70 | 135 | 0.499 | 15% |
| | | 0 | 160 | 70 | 135 | 0.855 | 26% |
| | | 0 | 180 | 70 | 135 | 2.265 | 70% |
| | | 0 | 120 | 40 | 150 | 2.065 | 63% |
| | | 0 | 140 | 40 | 150 | 2.256 | 69% |
| | | 0 | 180 | 110 | 70 | 1.566 | 48% |
| | | 0 | 200 | 110 | 70 | 0.511 | 16% |
| | | 0 | 220 | 110 | 70 | 0.497 | 15% |
| | | 0 | 240 | 110 | 70 | 1.527 | 47% |
| | | 0 | 200 | 90 | 50 | 1.727 | 53% |
| | | 0 | 220 | 90 | 50 | 1.121 | 34% |
| | | 0 | 240 | 90 | 50 | 1.593 | 49% |

Referring to Tables 1 to 3, the liquid crystal displays (LCD) according to Examples 1 to 7 show low average black luminance compared with the liquid crystal displays (LCD) according to Comparative Examples 1 to 3. Accordingly, the liquid crystal displays (LCD) according to Examples 1 to 7 are expected to show an improved contrast ratio relative to the liquid crystal displays (LCD) according to Comparative Examples 1 to 3.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising
a light source; and
a liquid crystal panel,
wherein the liquid crystal panel comprises:
a first substrate on the light source,
a second substrate facing the first substrate,
a liquid crystal layer between the first substrate and the second substrate,
a color conversion layer between the second substrate and the liquid crystal layer, and comprising a light emitting element configured to receive a first visible light from the light source and emit a second visible light,
a first polarizing layer between the liquid crystal layer and the color conversion layer,
a first phase difference layer between the liquid crystal layer and the first polarizing layer, and
a common electrode between the liquid crystal layer and the first phase difference layer,
wherein the first phase difference layer is disposed between the first substrate and the second substrate.

2. The liquid crystal display of claim 1, wherein the first phase difference layer comprises a heat resistant polymer, a heat resistant liquid crystal, or a combination thereof.

3. The liquid crystal display of claim 2, wherein the heat resistant polymer and the heat resistant liquid crystal each have a glass transition temperature of greater than or equal to about 150° C.

4. The liquid crystal display of claim 1, further comprising a second polarizing layer between the light source and the first substrate.

5. The liquid crystal display of claim 4, further comprising a second phase difference layer between the light source and the first substrate.

6. The liquid crystal display of claim 1, wherein the first phase difference layer has a refractive index satisfying Relationship Equation 1:

$$n_{x1} \geq n_{y1} > n_{z1} \quad \text{Relationship Equation 1}$$

wherein, in Relationship Equation 1,
$n_{x1}$ is a refractive index at a slow axis of the first phase difference layer,
$n_{y1}$ is a refractive index at a fast axis of the first phase difference layer, and
$n_{z1}$ is a refractive index in a direction perpendicular to the slow axis and the fast axis of the first phase difference layer.

7. The liquid crystal display of claim 6, wherein the first phase difference layer has retardation satisfying Relationship Equation 2:

$$40 \text{ nm} \leq R_{th1}(450 \text{ nm}) \leq 310 \text{ nm} \quad \text{Relationship Equation 2}$$

wherein, in Relationship Equation 2,
$R_{th1}$ (450 nm) is a thickness direction retardation of the first phase difference layer at a 450 nm wavelength.

8. The liquid crystal display of claim 6, further comprising a second phase difference layer between the light source and the first substrate, and
the second phase difference layer has a refractive index satisfying Relationship Equations 3 and 4:

$$n_{x2} > n_{y2} \quad \text{Relationship Equation 3}$$

$$n_{x2} > n_{z2} \quad \text{Relationship Equation 4}$$

wherein, in Relationship Equations 3 and 4,
$n_{x2}$ is a refractive index at a slow axis of the second phase difference layer,
$n_{y2}$ is a refractive index at a fast axis of the second phase difference layer, and
$n_{z2}$ is a refractive index in a direction perpendicular to the slow axis and the fast axis of the second phase difference layer.

9. The liquid crystal display of claim 8, wherein the second phase difference layer has a refractive index satisfying Relationship Equation 5-1:

$$n_{x2} > n_{y2} = n_{z2} \quad \text{Relationship Equation 5-1}$$

wherein, in Relationship Equation 5-1,
$n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

10. The liquid crystal display of claim 9, wherein the second phase difference layer has a retardation satisfying Relationship Equation 6-1:

$$70 \text{ nm} \leq R_{in2}(450 \text{ nm}) \leq 170 \text{ nm} \quad \text{Relationship Equation 6-1}$$

wherein, in Relationship Equation 6-1, $R_{in2}$ (450 nm) is in-plane retardation of the second phase difference layer at a 450 nm wavelength.

11. The liquid crystal display of claim 10, wherein the first phase difference layer has retardation satisfying Relationship Equation 2-1:

$$130 \text{ nm} \leq R_{th1}(450 \text{ nm}) \leq 310 \text{ nm} \quad \text{Relationship Equation 2-1}$$

wherein, in Relationship Equation 2-1, $R_{th1}$ (450 nm) is thickness direction retardation of the first phase difference layer at a 450 nm wavelength.

12. The liquid crystal display of claim 9, further comprising a third phase difference layer on or under the second phase difference layer, and between the light source and the first substrate, and wherein the third phase difference layer has a refractive index satisfying Relationship Equations 7 and 8:

$$n_{x3} > n_{z3} \quad \text{Relationship Equation 7}$$

$$n_{y3} > n_{z3} \quad \text{Relationship Equation 8}$$

wherein, in Relationship Equations 7 and 8, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

13. The liquid crystal display of claim 12, wherein the third phase difference layer has a refractive index satisfying Relationship Equation 9:

$$n_{x3} \leq n_{y3} > n_{z3} \quad \text{Relationship Equation 9}$$

wherein, in Relationship Equation 9, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

14. The liquid crystal display of claim 13, wherein the first phase difference layer and the third phase difference layer each have retardation satisfying Relationship Equation 10:

$$130 \text{ nm} \leq R_{th1}(450 \text{ nm}) + R_{th3}(450 \text{ nm}) \leq 310 \text{ nm} \quad \text{Relationship Equation 10}$$

wherein, in Relationship Equation 10, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

15. The liquid crystal display of claim 14, wherein the first phase difference layer and the third phase difference layer each have a phase difference satisfying Relationship Equations 11 and 12:

$$20 \text{ nm} \leq R_{th1}(450 \text{ nm}) \leq 290 \text{ nm} \quad \text{Relationship Equation 11}$$

$$20 \text{ nm} \leq R_{th3}(450 \text{ nm}) \leq 290 \text{ nm} \quad \text{Relationship Equation 12}$$

wherein, in Relationship Equations 11 and 12, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

16. The liquid crystal display of claim 8, wherein the second phase difference layer has a refractive index satisfying Relationship Equation 5-2:

$$n_{x2} > n_{y2} > n_{z2} \quad \text{Relationship Equation 5-2}$$

wherein, in Relationship Equation 5-2, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

17. The liquid crystal display of claim 16, wherein the second phase difference layer has retardation satisfying Relationship Equations 6-2 and 6-3:

$$40 \text{ nm} \leq R_{in2}(450 \text{ nm}) \leq 110 \text{ nm} \quad \text{Relationship Equation 6-2}$$

$$40 \text{ nm} \leq R_{th2}(450 \text{ nm}) \leq 200 \text{ nm} \quad \text{Relationship Equation 6-3}$$

wherein, in Relationship Equations 6-2 and 6-3, $R_{in2}$ (450 nm) is in-plane retardation of the second phase difference layer at a 450 nm wavelength, and $R_{th2}$ (450 nm) is thickness direction retardation of the second phase difference layer at a 450 nm wavelength.

18. The liquid crystal display of claim 17, wherein the first phase difference layer has retardation satisfying Relationship Equation 2-2:

$$40 \text{ nm} \leq R_{th1}(450 \text{ nm}) \leq 260 \text{ nm} \quad \text{Relationship Equation 2-2}$$

wherein, in Relationship Equation 2-2, $R_{th1}$ (450 nm) is thickness direction retardation of the first phase difference layer at a 450 nm wavelength.

19. The liquid crystal display of claim 1, wherein the light emitting element comprises a quantum dot, a phosphor, or a combination thereof.

20. The liquid crystal display of claim 1, wherein the second visible light has a same wavelength as the first visible light or a longer wavelength than the first visible light.

21. The liquid crystal display of claim 20, wherein the first visible light is blue light, and wherein the second visible light is blue light, green light, red light, or a combination thereof.

22. The liquid crystal display of claim 1, wherein the liquid crystal panel further comprises a pixel electrode facing the common electrode in the center of the liquid crystal layer, and wherein the liquid crystal layer comprises liquid crystals aligned in a direction vertical to each of the first substrate and the second substrate in the absence of an electric field.

23. A liquid crystal display, comprising, a first substrate, a color conversion layer, a first polarizing layer, a first phase difference layer, a common electrode, a liquid crystal layer, a pixel electrode, a second phase difference layer, a second polarizing layer, and a light source disposed in this order, wherein the first phase difference layer is in direct contact with the common electrode, wherein the color conversion layer comprises a light emitting element configured to receive a first visible light from the light source and emit second visible light, and the second visible light has a same wavelength as the first visible light or a longer wavelength than the first visible light, wherein the first phase difference layer has a refractive index satisfying Relationship Equation 1, and the second phase difference layer has a refractive index satisfying Relationship Equations 3 and 4:

$$n_{x1} \geq n_{y1} > n_{z1} \qquad \text{Relationship Equation 1}$$

wherein, in Relationship Equation 1, $n_{x1}$ is a refractive index at a slow axis of the first phase difference layer, $n_{y1}$ is a refractive index at a fast axis of the first phase difference layer, and $n_{z1}$ is a refractive index in a direction perpendicular to the slow axis and the fast axis of the first phase difference layer, $$n_{x2} > n_{y2} \qquad \text{Relationship Equation 3}$$

$$n_{x2} > n_{z2} \qquad \text{Relationship Equation 4}$$

wherein, in Relationship Equations 3 and 4, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

24. The liquid crystal display of claim 23, wherein the second phase difference layer has a refractive index satisfying Relationship Equation 5-1:

$$n_{x2} > n_{y2} = n_{z2} \qquad \text{Relationship Equation 5-1}$$

wherein, in Relationship Equation 5-1, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

25. The liquid crystal display of claim 24, wherein the first phase difference layer has retardation satisfying Relationship Equation 2-1, and the second phase difference layer has retardation satisfying Relationship Equation 6-1:

$$130 \text{ nm} \leq R_{th1}(450 \text{ nm}) \leq 310 \text{ nm} \qquad \text{Relationship Equation 2-1}$$

$$70 \text{ nm} \leq R_{in2}(450 \text{ nm}) \leq 170 \text{ nm} \qquad \text{Relationship Equation 6-1}$$

wherein, in Relationship Equation 2-1 or 6-1, $R_{th1}$ (450 nm) is thickness direction retardation of the first phase difference layer at a 450 nm wavelength, and $R_{in2}$ (450 nm) is in-plane retardation of the second phase difference layer at a 450 nm wavelength.

26. The liquid crystal display of claim 24, further comprising a third phase difference layer on or under the second phase difference layer, and between the light source and the first substrate, and wherein the third phase difference layer has a refractive index satisfying Relationship Equations 7 and 8:

$$n_{x3} > n_{z3} \qquad \text{Relationship Equation 7}$$

$$n_{y3} > n_{z3} \qquad \text{Relationship Equation 8}$$

wherein, in Relationship Equations 7 and 8, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

27. The liquid crystal display of claim 26, wherein the third phase difference layer satisfies a refractive index of Relationship Equation 9:

$$n_{x3} \geq n_{y3} > n_{z3} \qquad \text{Relationship Equation 9}$$

wherein, in Relationship Equation 9, $n_{x3}$ is a refractive index at a slow axis of the third phase difference layer, $n_{y3}$ is a refractive index at a fast axis of the third phase difference layer, and $n_{z3}$ is a refractive index in a direction perpendicular to the slow axis and the fast axis of the third phase difference layer.

28. The liquid crystal display of claim 27, wherein the first phase difference layer and the third phase difference layer each have retardation satisfying Relationship Equation 10:

$$130 \text{ nm} \leq R_{th1}(450 \text{ nm}) + R_{th3}(450 \text{ nm}) \leq 310 \text{ nm} \qquad \text{Relationship Equation 10}$$

wherein, in Relationship Equation 10, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

29. The liquid crystal display of claim 28, wherein the first phase difference layer and the third phase difference layer each have a phase difference satisfying Relationship Equations 11 and 12:

$$20 \text{ nm} \leq R_{th1}(450 \text{ nm}) \leq 290 \text{ nm} \qquad \text{Relationship Equation 11}$$

$$20 \text{ nm} \leq R_{th3}(450 \text{ nm}) \leq 290 \text{ nm} \qquad \text{Relationship Equation 12}$$

wherein, in Relationship Equations 11 and 12, $R_{th1}$ (450 nm) is thickness direction retardation of the first phase difference layer at a 450 nm wavelength, and $R_{th3}$ (450 nm) is thickness direction retardation of the third phase difference layer at a 450 nm wavelength.

30. The liquid crystal display of claim 23, wherein the second phase difference layer has a refractive index satisfying Relationship Equation 5-2:

$$n_{x2} > n_{y2} > n_{z2} \qquad \text{Relationship Equation 5-2}$$

wherein, in Relationship Equation 5-2, $n_{x2}$ is a refractive index at a slow axis of the second phase difference layer, $n_{y2}$ is a refractive index at a fast axis of the second phase difference layer, and $n_{z2}$ is a refractive index in a direction perpendicular to the slow axis and the fast axis of the second phase difference layer.

31. The liquid crystal display of claim 30, wherein the first phase difference layer has retardation satisfying Relationship Equation 2-2, and the second phase difference layer has retardation satisfying Relationship Equations 6-2 and 6-3:

$$40 \text{ nm} \leq R_{th1}(450 \text{ nm}) \leq 260 \text{ nm} \qquad \text{Relationship Equation 2-2}$$

$$40 \text{ nm} \leq R_{in2}(450 \text{ nm}) \leq 110 \text{ nm} \qquad \text{Relationship Equation 6-2}$$

$$40 \text{ nm} \leq R_{th2}(450 \text{ nm}) \leq 200 \text{ nm} \qquad \text{Relationship Equation 6-3}$$

wherein, in Relationship Equation 2-2, 6-2, or 6-3, $R_{th1}$ (450 nm) is thickness direction retardation of the first phase difference layer at a 450 nm wavelength $R_{in2}$ (450 nm) is in-plane retardation of the second phase difference layer at a 450 nm wavelength, and $R_{th2}$ (450 nm) is thickness direction retardation of the second phase difference layer at a 450 nm wavelength.

32. The liquid crystal display of claim 23, wherein the first visible light is blue light and the second visible light is blue light, green light, red light, or a combination thereof.

33. The liquid crystal display of claim 1, wherein the first phase difference layer is in direct contact with the common electrode.

* * * * *